(12) United States Patent
Lyren

(10) Patent No.: US 10,313,634 B1
(45) Date of Patent: *Jun. 4, 2019

(54) DISPLAY AN IMAGE DURING A COMMUNICATION

(71) Applicant: Four Mile Bay, LLC, Wadsworth, OH (US)

(72) Inventor: Philip Scott Lyren, Bangkok (TH)

(*) Notice: Subject to any disclaimer, the term of this patent is extended or adjusted under 35 U.S.C. 154(b) by 0 days.

This patent is subject to a terminal disclaimer.

(21) Appl. No.: 16/246,494

(22) Filed: Jan. 12, 2019

Related U.S. Application Data

(63) Continuation of application No. 16/161,239, filed on Oct. 16, 2018, now Pat. No. 10,237,517, which is a continuation of application No. 16/021,045, filed on Jun. 28, 2018, now Pat. No. 10,110,853, which is a continuation of application No. 15/944,794, filed on Apr. 4, 2018, now Pat. No. 10,044,984, which is a continuation of application No. 15/825,131, filed on Nov. 29, 2017, now Pat. No. 9,955,121, which is a continuation of application No. 15/632,300, filed on Jun. 24, 2017, now Pat. No. 9,848,171, which is a
(Continued)

(51) Int. Cl.
| | |
|---|---|
| *H04N 7/14* | (2006.01) |
| *H04N 7/15* | (2006.01) |
| *H04R 1/00* | (2006.01) |
| *H04N 13/332* | (2018.01) |
| *H04N 13/344* | (2018.01) |
| *H04N 13/167* | (2018.01) |
| *H04N 13/398* | (2018.01) |
| *G02B 27/01* | (2006.01) |
| *H04N 13/194* | (2018.01) |
| *H04N 13/189* | (2018.01) |
| *H04N 13/383* | (2018.01) |

(52) U.S. Cl.
CPC .......... *H04N 7/157* (2013.01); *G02B 27/017* (2013.01); *G02B 27/0176* (2013.01); *H04N 7/144* (2013.01); *H04N 7/147* (2013.01); *H04N 13/167* (2018.05); *H04N 13/189* (2018.05); *H04N 13/194* (2018.05); *H04N 13/332* (2018.05); *H04N 13/344* (2018.05); *H04N 13/383* (2018.05); *H04N 13/398* (2018.05); *H04R 1/00* (2013.01); *G02B 2027/014* (2013.01); *G02B 2027/0134* (2013.01); *G02B 2027/0178* (2013.01); *G02B 2027/0187* (2013.01); *H04N 2007/145* (2013.01)

(58) Field of Classification Search
CPC combination set(s) only.
See application file for complete search history.

(56) References Cited

U.S. PATENT DOCUMENTS

| | | | |
|---|---|---|---|
| 2012/0105473 A1* | 5/2012 | Bar-Zeev | G02B 27/017 345/633 |
| 2013/0249947 A1* | 9/2013 | Reitan | G06F 3/011 345/633 |

(Continued)

*Primary Examiner* — Duc Nguyen
*Assistant Examiner* — Assad Mohammed

(57) ABSTRACT

An electronic device displays an image during a communication between two people. The image represents one of the people to the communication. The electronic device determines a location where to place the image and displays the image such that the image appears to exist at the location.

20 Claims, 19 Drawing Sheets

Related U.S. Application Data continuation of application No. 14/823,582, filed on Aug. 11, 2015, now Pat. No. 9,690,103.

(60) Provisional application No. 62/116,642, filed on Feb. 16, 2015.

(56) References Cited

U.S. PATENT DOCUMENTS

2015/0215581 A1* 7/2015 Barzuza ............... G06T 19/006
   348/14.1
2015/0341541 A1* 11/2015 Naik ................ H04N 5/23206
   348/207.11

* cited by examiner

DISPLAY AN IMAGE DURING A COMMUNICATION

BACKGROUND

Handheld electronic devices enable two parties to communicate in real-time with each other over large distances. By way of example, two people can exchange text messages, telephone each other, conduct a video call, transmit emails, and communicate using other methods.

Advancements in communication technology will assist parties in communicating with each other via electronic devices.

SUMMARY OF THE INVENTION

Figure 1:
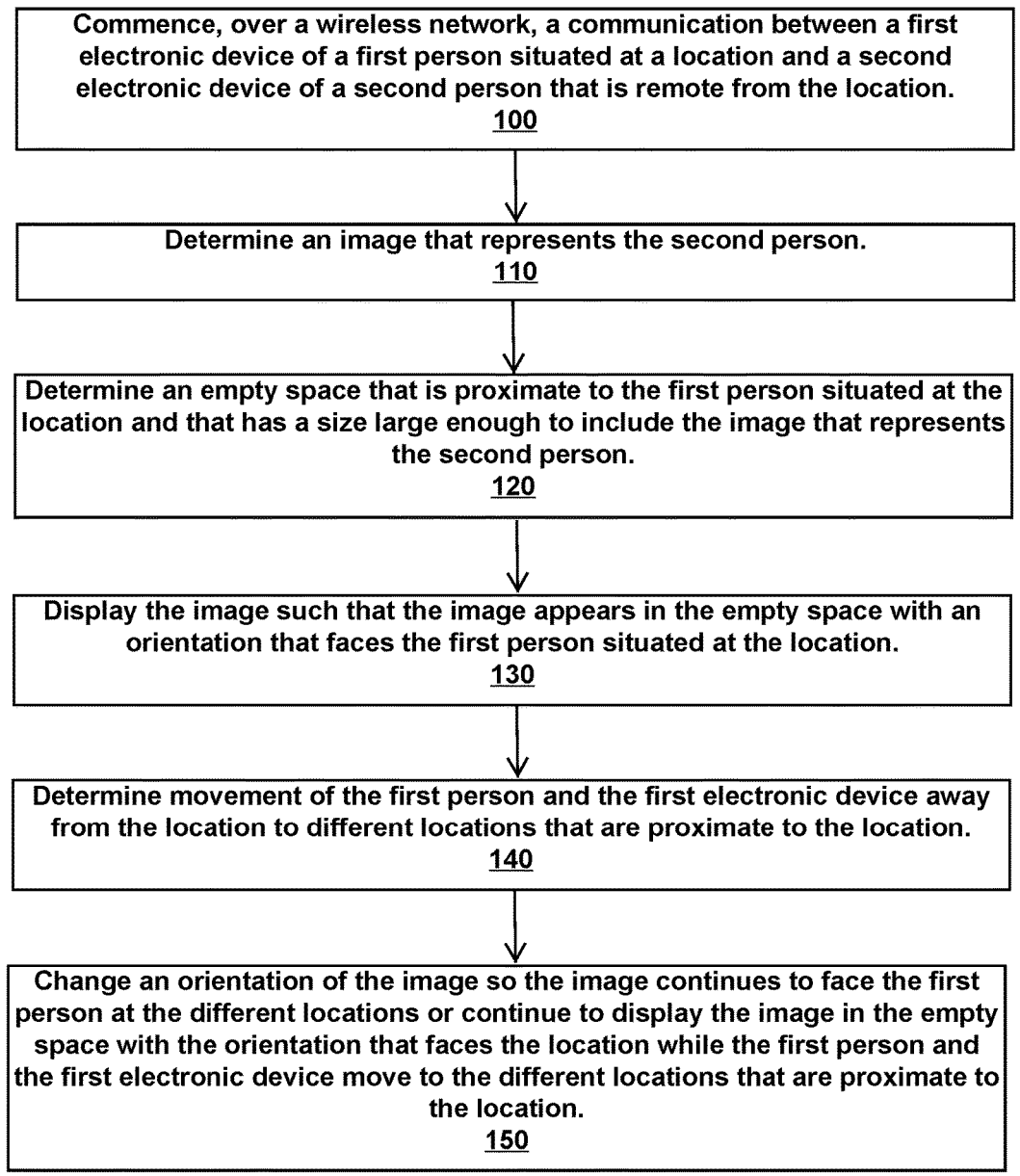
FIG. 1 is a method to display an image in empty space during a communication between parties in accordance with an example embodiment.

Example embodiments include systems, apparatus, and methods that display an image during a communication between two or more people. An electronic device determines a location where to place an image and displays the image such that the image appears to exist at the location during the communication.

Other example embodiments are discussed herein.

DETAILED DESCRIPTION

Example embodiments include systems, apparatus, and methods that assist parties in communicating with each other.

In an example embodiment, an electronic device displays to a first person an image of a second person during a telephone call such that the second person appears to exist at the location of the first person during the telephone call. The image is sized and shaped to represent or emulate the second person, and the image is placed and oriented at the location to simulate how the conversation would occur if both the first and second person were located at the same place and talking with each other.

An orientation of the image of the second person depends, for example, on which objects are located near the first person. For example, the image can be altered or oriented to appear on an object near the first person (such as orienting the image to sit on an empty chair that exists next to the first person or orienting the image to stand next to a table that exists near the first person). Orientation of the image can be based on objects and/or environmental conditions at the location of the first person.

An electronic device also determines areas and/or objects that are suitable and available to receive an image of a person during a communication. These areas and/or objects can be displayed to a person so the person knows in advance where an image will appear or to where the user should move in order to participate in a call with another person. For example, the electronic device determines areas that are large enough to accommodate an image of a person during a telephone call and then shows the person where these areas are located.

An electronic device also displays call histories that provide visual information of where a person was located during a call, where an image was located during a call, and other information. A user can quickly see and understand a large amount of call history information.

An electronic device also provides a preview of an image before a telephone call or communication commences. The user is able to see where the image will appear before the call and also see what the image will be.

In an example embodiment, an electronic device determines or knows a location of its user and objects that are proximate to the user. The electronic device also determines or identifies these objects, such as identifying one object as a table, another object as a chair, another object as a sofa, etc. Based on this information, the electronic device places an image of a caller proximate to the user when the user and the caller engage in a communication. The image of the caller appears to the user to exist at this location since the image interacts with the objects. For example, the image sits on a chair or stands next to a filing cabinet.

A size, shape, and appearance of the image are configured to coincide with the environment or location of the user. These configurations assist in making the image appear to exist at the location in a natural or real way. For example, if the image is a person (such as a caller to the communication), then the image appears with a height, weight, and appearance of the caller. In this manner, the image emulates the caller, and the user sees and interacts with the image as if the image were the actual caller instead of an image of the caller.

FIG. 1 is a method to display an image in empty space during a communication between parties.

Block 100 states commence, over a wireless network, a communication between a first electronic device of a first person situated at a location and a second electronic device of a second person that is remote from the location.

By way of example, the electronic devices communicate an electronic call over one or more wireless networks and implement one or more different communication methodologies. For instance, the communication includes, but is not limited to, one or more of a phone call, a video call, a communication using binaural sound, a conference call, a communication over the Internet or other network, a cellular call, etc. Further, the first and second person can be remote from each other, such as being separated from each other and/or being in separate or different locations (such as being in separate rooms, separate buildings, separate cities, separate states, separate countries, etc.).

Block 110 states determine an image that represents the second person.

By way of example, an electronic device captures, obtains, processes, creates, receives, or retrieves an image or video of the second person or an image or video that represents the second person. As an example, an electronic device captures a picture of the second person, and this image displays and represents the second person during the communication. As another example, the first or second person uploads a photograph or a picture that represents the second person during the communication. For instance, the second person uploads a photo of an animal, a building, a logo, scenery, nature, or other photo, and the electronic device of the first person displays this photo or a variation of this photo to represent the second person. As another example, an electronic device captures real-time video and/or images of the second person and uses this captured information to build a three-dimensional (3D) image or video from this real-time information. As yet another example, a camera captures video of the second person, and this video represents the second person. As yet another example, the image includes a virtual image or virtual object.

Block 120 states determine an empty space that is proximate to the first person situated at the location and that has a size large enough to include the image that represents the second person.

By way of example, an electronic device executes object recognition software to determine an area or location that is not occupied with a physical object. For instance, an object recognizer recognizes an object as chair, determines that the chair is unoccupied, and calculates a size and a location of a seating area on the chair. As another example, a structure (such as a store or a room) includes physical areas that are empty and designated as available empty space. For instance, a 3D column or box of empty space located next to table or a chair is designated as empty space, and this location is provided to electronic devices.

As another example, an electronic device scans and monitors objects and areas surrounding and/or proximate to the electronic device and maps locations of these objects and areas. For instance, a map includes information about objects and empty spaces, such as coordinates or location information about the objects and empty spaces, sizes and shapes of the objects and empty spaces (including measurements or approximations of length, width, and height of the objects and empty spaces), an identification or categorization of the objects and empty spaces (such as an object being a chair, a sofa, a desk, a cabinet, etc., or an empty space being indoors or outdoors), whether the objects are movable, mobile, stationary, and permanent (such as determining that an object is a person versus a table).

Block 130 states display the image such that the image appears in the empty space with an orientation that faces the first person situated at the location.

In an example embodiment, the image of the second person appears to the first person to be situated or located in the empty space. For instance, an electronic device projects the image into the empty space. As another example a display displays the image such that the image appears to exist in the empty space even though the empty space remains empty and void of any projection or physical object.

An orientation or direction of the image or one or more portions of the image face the first person that is situated at the location. As an example, a portion of the image rotates to face or be directed toward or at the first person. For instance, a face or head of the image orients to be directed toward or looking at the first person.

The image is sized, shaped, and oriented so it appears to actually exist at the location from the point of view of the first person. When the location is in the field of view of the first person, the image appears at this location as if it actually existed at this location. For example, while the first person actually sits on a chair at a table, an image of the second person appears to be sitting on another chair of the table even though in reality the chair is empty. A size of the image of second person emulates or approximates a size of the second person.

Block 140 states determine movement of the first person and the first electronic device away from the location to different locations that are proximate to the location.

By way of example, an electronic device tracks, follows, or monitors the movement and location of the first person. For instance, while the image of the second person appears to the first person to be situated on a sofa in a room, the first person walks to different locations in the room. An electronic device tracks movement of the first person in the room and knows a location of the first person with respect to the image of the second person on the sofa.

Block 150 states change an orientation of the image so the image continues to face the first person at the different locations or continue to display the image in the empty space with the orientation that faces the location while the first person and the first electronic device move to the different locations that are proximate to the location.

In an example embodiment, an orientation of the image of the second person faces or is directed toward an initial location of the first person. When, while, or after the first person moves away from this initial location, the image of the second person continues to face toward the initial location even though the first person is physically located at a different location. Alternatively, the image of the second person moves, adjusts, or rotates from the initial position when or while the first person moves so the image appears to follow, to watch, or to track the movement and location of the first person in real time as the first person moves.

Consider an example in which a first person sits on a first chair in a room with a second chair located directly in front of the first person and first chair. The second chair is empty. The first person wears electronic glasses and initiates with these electronic glasses a phone call to a handheld portable electronic device (HPED) of a second person located in a different country. When the phone call commences, the electronic glasses retrieve a 3D image of the second person and display this 3D image on a display of the electronic glasses. From the point of view of the first person, this 3D image appears to sitting in the second chair that is located in front of the first person. Other individuals (such as people around or near the first person) can see the second chair but cannot see the 3D image since this image appears on or thru the display of the electronic glasses worn by the first person. The 3D images has a size of man that weighs 170 pounds and is six feet tall since the second person weights 170 pounds and is six feet tall. A face of the 3D image emulates or copies a real face of the second person, and this face of the 3D image is directed toward the first person during the phone call such that the second person appears to be sitting on the chair and talking to the first person.

In one example embodiment, as the first person wearing the electronic glasses stands up from the first chair and moves around the room, the face of the 3D image remains directed toward the first chair from the point of view of the first person as see on or thru the electronic glasses. Thus, even though the electronic glasses move with respect to the first and second chairs, the 3D image of the second person appears to the first person to remain directed toward or looking at the first chair. As the first person moves, the display of the electronic glasses simultaneously changes or alters the 3D image of the second person such that the second person appears to remain sitting on the chair and looking at the first chair which is now empty since the first person stood up and walked away from it.

In another example embodiment, as the first person wearing the electronic glasses stands up from the first chair and moves around the room, the face of the 3D image rotates or moves so as to be directed toward the first person. Thus, while the electronic glasses move with respect to the first and second chairs, the 3D image of the second person appears to the first person to move such that a face of the second person continues to be directed toward or looking at the first person. As the first person moves, the display of the electronic glasses simultaneously changes or alters the 3D image of the second person such that the second person appears to remain sitting on the chair and looking at the first person as the first person moves about the room to different locations.

Consider an example in which a first person enters a coffee shop while wearing a wearable electronic device (WED) that receives a phone call from a smart phone of a second person. The WED determines available locations in the coffee shop that include an empty space that can include an image of the second person during the phone call. These locations are large enough to accommodate an image of the second person that has a size and shape of the second person (e.g., a location large enough to accommodate a person with a height, weight, shape, and orientation of a caller).

In this example, a computer of the coffee shop or other electronic device or devices in the coffee shop (such as WEDs, smart phones, and HPEDs of other customers) provide the available locations to the WED of the first person. The WED selects a suitable and available location and displays this location to the first person who proceeds to walk to the selected location. Upon arriving at or near the location, the WED displays a 3D image of the second person during the phone call. The WED localizes the voice of the second person such that the voice emanates from the location of the image in empty space. When the phone call terminates, the 3D image of the second person disappears from the display, and the WED notifies the computer of the coffee shop or the other electronic devices in the coffee shop that the phone call is finished and the location is free or available for an image during another phone call.

Figure 2:
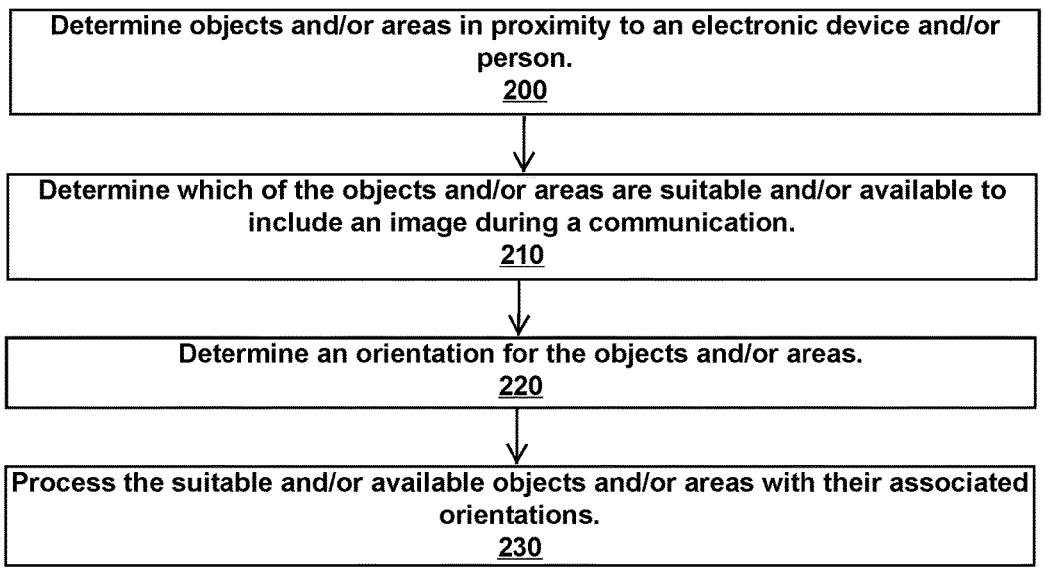
FIG. 2 is a method to determine available objects and/or areas for a communication in accordance with an example embodiment.

FIG. 2 is a method to determine available objects and/or areas for a communication.

Block 200 states determine objects and/or areas in proximity to an electronic device and/or person.

An electronic device determines objects and areas (including empty spaces) at a location. By way of example, this determination originates from an object recognizer, an electronic map that includes locations of objects and empty spaces, a server (such as a cloud server), satellite imagery, and/or electronic devices (such as electronic devices located at or proximate to an area).

The objects and/or areas are identified, recognized, and/or classified. For instance, physical objects are identified (such as identifying a person, a floor of a building or structure, an object as a chair, a table, a couch, a column, a wall, a counter, a refrigerator, an appliance, etc.). Areas or spaces are also identified (such as being on, with, or proximate to an object, having a determined shape (circular, rectangular, square, polygonal, etc.), having a determined size (length, width, and height), and/or being fully or partially empty or occupied.

Block 210 states determine which of the objects and/or areas are suitable and/or available to include an image during a communication.

An object and/or an area may or may not be suitable for a communication based on one or more factors. By way of example, these factors include, but are not limited to, a size of the object and/or area (including its length, width, and/or height), a size of a volume or surface area of the object and/or area, a shape of the object and/or area, a location of the object and/or area, a proximity of the object and/or area to other objects and/or areas, a noise level at the object and/or area, an environmental condition at the object and/or area (such as temperature, rain, wind, etc.), an identification of the object and/or area (such as the object being identified as a chair, an automobile, etc.), a level of privacy associated with the object and/or area (e.g., whether other people not a party to the communication can hear a conversation taking place at the object and/or area), a size, shape, weight, or orientation of a person to the communication (such as the location having a sufficient size to include an actual or real size of a caller or party to the communication), a size and/or shape of an image that represents a person to the communication (such as the location having a sufficient size and/or shape to include an image that represents a caller or person to the communication).

Some objects can be designated as being suitable or unsuitable to receive or include an image during a communication. For example, people often communicate on a computer or phone while sitting on a chair, a couch, a bed, or another object where people sit; and such objects can be designated as suitable for a communication. By contrast, other objects can be designated as unsuitable for a communication, such as home appliances (e.g., a refrigerator, an oven, a washing machine, etc.), machinery, office equipment (e.g., filing cabinets, desks, printers, etc.), and other objects not used for supporting or including a person during a communication.

Areas can also be designated as being suitable or unsuitable to receive or include an image during a communication. Examples of suitable areas include, but are not limited to, an area on and/or above a seat of a chair, a couch, a bed, or another object where people sit. Suitable areas also include areas where people often or typically stand to engage in a communication. Examples of unsuitable areas include, but are not limited to, areas with a level of noise at or over a predetermined level (such as being over a specific decibel level), areas with certain environmental conditions (such as a location being colder or hotter than a predetermined level, having rain or snow, having wind, etc.), crowded areas, compact areas, dark areas, areas under objects (such as being under a table or being in an entrance way to a store), areas that are dangerous, and other areas generally not conducive for including an image that represents a person during a communication.

Even though an object or an area is suitable to receive or include an image that represents a person during a communication, the object or area may not be available to include the image during the communication. For example, the object or area can be occupied with another image. For instance, an electronic device of a first person displays on an empty chair an image of a friend with whom the first person is talking. An electronic device of a second person near the empty chair is aware of this communication and designates the empty chair as being unavailable to receive or include an image of a person with whom the second person desires to talk. The second person cannot see or detect the image of the friend of the first person since this image is private and hence viewable by the first person and not other persons, including the second person. The electronic device of the second person, however, notifies the second person that the chair is being used for a communication and hence not available.

As another example, the object or area can be reserved. For instance, a first person schedules a conference call for 11:00 a.m. in a coffee shop and at 10:45 a.m. reserves or designates an empty chair and/or an area above the empty chair as being unavailable for another person to sit or to place an image for a communication. Electronic devices of other people determine that this chair and/or area above the chair is reserved or otherwise unavailable.

As another example, the object or area can be restricted. For instance, a public library wants certain areas in the library to remain quiet and designates these areas as not available for receiving or including an image during a communication. While in the library, a person receives a phone call on his smart phone, and a display of the smart phone shows areas that are restricted or prohibited from including images for the phone call.

Block 220 states determine an orientation for the objects and/or areas.

Objects and/or areas can have a direction or orientation depending, for example, on their design and/or location. For example, a chair with a seat, a back, and armrests, is designed to have occupants sit in the chair with their backs to the back of the chair and their arms on the armrests of the chair. While sitting in the chair, the occupants face in a forward direction per the design of the chair. As another example, a couch or a sofa can include both a sitting surface and a back portion. Occupants sit on the sitting surface of the couch or sofa with their backs against the back portion. While sitting on the couch or sofa, the occupants face in a forward direction per the design of the couch or sofa. As yet another example, a stool with a swiveling seat is designed to have occupants sit on the swiveling seat and rotate to a desired direction.

Areas can also have a direction or orientation depending on their size, shape, and/or location. For example, a house with a kitchen has an empty area that extends from a wall in the kitchen to a center of the kitchen. A forward or facing direction of this area would be from the wall toward the center of kitchen. The wall would define a back of this area, and an image displayed to appear in this area would have its back against or facing the wall. For instance, a default orientation of an image would be to place a back of the image toward the wall and place a front or face of the image to toward the center of the kitchen.

Block 230 states process the suitable and/or available objects and/or areas with their associated orientations.

By way of example, process includes, but is not limited to, display, store, map, build, transmit, and/or execute the information about the object and/or area. For instance, this information includes, but is not limited to, a size of the object and/or area, a shape of the object and/or area, a location of the object and/or area, a color of the object and/or area, ambient or environmental conditions of the object and/or area, a noise level of the object and/or area, a cost to use or rent the object and/or area, a length of time of availability of the object and/or area, an orientation of the object and/or area, whether the object and/or area is occupied, empty, available, unavailable, suitable, and/or unsuitable, and other information discussed herein.

Consider an example in which a handheld portable electronic device (HPED) of a user continually, continuously, or periodically determines and stores objects and areas that are proximate to the user as the user moves from one location to another location. The HPED stores this information and constructs or builds a map of the suitable and available locations for a communication. When the user receives a phone call, the HPED selects an available and suitable empty space proximate to the user and displays an image of the caller to the user at or in this empty space.

Consider an example in which an HPED of a user commences a video conference communication with electronic devices of other users. The HPED determines several different locations proximate to the user that are available to receive images of the other users during the communication. Based on user preferences and previous or historic user selections, the HPED selects one of the locations and places images of the other users at this location during the communication.

Consider an example in which an HPED builds or accesses a map of objects and areas proximate to a user as the user moves. When the user commences a voice and video communication with a computer over the Internet, the HPED reviews the map and determines an empty chair exists three feet to the side of the user. While the HPED and computer connect to commence the communication, a display shows the user that images during the call will be placed on the empty chair next to the user. When the communication commences, the HPED displays the images at the location on the chair as previously shown to the user.

In an example embodiment, locations of objects and/or areas are stored along with information, including but not limited to information about their size, shape, availability, suitability, and other information. For example, a location for a chair includes one or more of the following information: GPS coordinates of the chair (or other identifying information as to the location or identification of the chair), a description of the chair (e.g., including its shape, its materials, its style, etc.), a picture of the chair, availability of the chair (e.g., whether the chair is occupied with a person or with an image, how long a user can use the chair to receive an image during a communication, time restraints or time restrictions with the chair, etc.), suitability of the chair (e.g., whether the chair is large enough to accommodate an image or images, has a suitable noise level at its location, etc.), an orientation of the chair (e.g., which direction the chair faces), a list of objects or people proximate to the chair (e.g., a number of people present in a vicinity of the chair), an identification of the location of the chair (e.g., identify the name of a building, store, house, office, or other location where the chair exists), and a cost of using the chair (e.g., a cost to rent the space on the chair to accommodate an image during a communication).

This information about the objects and/or areas can be processed, mapped, and stored (such as stored on an individual HPED and/or stored on a server or other electronic device). Furthermore, the information can be shared (such as transmitted over a private wireless peer-to-peer network from one HPED to another HPED or transmitted to a central server that HPEDs access).

Consider an example in which an electronic device determines a suitable and available location of empty space to accommodate an image during a future conference call that will take place for one hour starting at 1:00 p.m. on June 20th. The electronic device designates this space as unavailable between 1:00 p.m. and 2:00 p.m. on June 20th and provides this information to other electronic devices and/or a server that stores information about objects and/or areas. Before or during the conference call, other electronic devices and users are aware that the area is unavailable during the designated time. Dissemination of this information prevents another electronic device and/or user from attempting to use the area during the designated time and/or accidentally disrupting use of the location. For example, another user is preparing to walk through the location or sit at the location during the conference call, and an electronic device of this other user provides a visual or audio warning or notification that the location is being used. As another example, an electronic device of another user displays a map that shows the location marked with a visual indication that notifies the other user that this location is being used to accommodate an image during a conference call.

Consider an example in which a display of an electronic device displays areas proximate to a user as being available or unavailable. The electronic device displays these areas with a visual indication of their availability status (such as displaying areas with different colors, different shapes, indicia, text, etc. to notify a user of their availability status). For instance, a display simultaneously displays three-dimensional (3D) images of empty spaces that are available to include the image of a person during a call and 3D images of empty spaces that are occupied with 3D images from other electronic devices and hence not available to include the image of the person during the call. These images appear to the user as virtual objects or virtual images.

Consider an example in which a first user desires to wirelessly communication over one or more networks with a second user. An electronic device of the first user identifies an object that is proximate to a location of the electronic device and/or the first user of the electronic device. The electronic device further determines whether an empty space on the object is occupied with another image during a communication between other electronic devices and other users. When the object is not occupied with another image, the electronic device of the first user displays a 3D image that represents the second user in the empty space on the object. This image appears to be the second user, and the first user talks to the image as if the second user were actually located and oriented on the object as the image is located and oriented.

An electronic device can select an object and/or an area to display or to project an image based on different factors. By way of example, such factors include, but are not limited to, an arbitrary location proximate to the user (e.g., a location within two to eight feet of the user), a location based on user preferences, a location based on previous or historical user selections, a predetermined location (e.g., in front of the user or to a side of the user), a location based on a direction of gaze of the user (e.g., a location along a line of sight of a user), a location in a field of view of the user, a location within a predetermined or specified distance from the user or an electronic device, a location selected by a user, a location based on object recognition, a location based on area or space recognition, a location based on suitability and/or availability, a location based on cost (e.g., cost to rent or use an empty space or an object), and another factor discussed herein.

Figure 3:
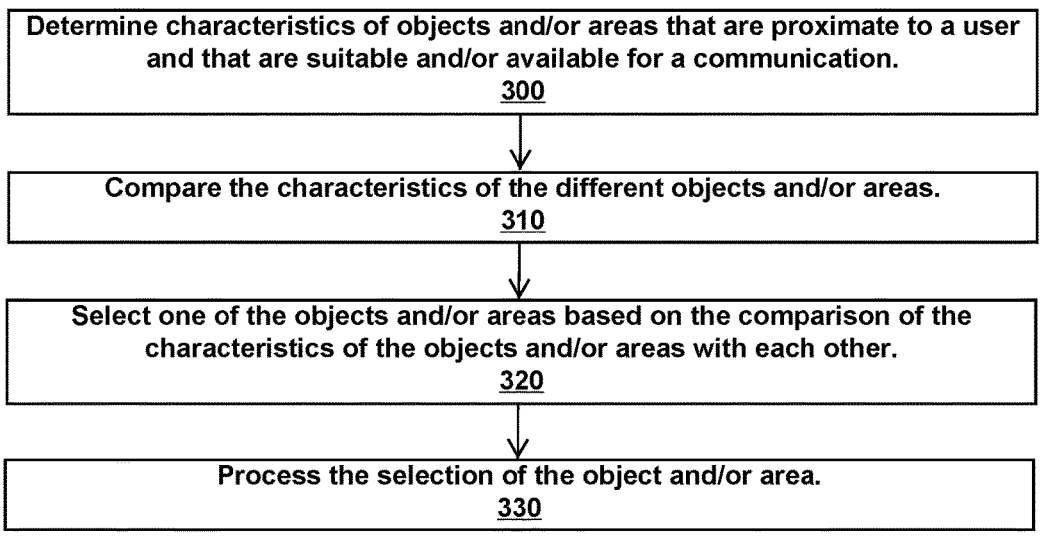
FIG. 3 is a method to select an object and/or an area for a communication from multiple different objects and/or areas in accordance with an example embodiment.

FIG. 3 is a method to select an object and/or an area for a communication from multiple different objects and/or areas.

Block 300 states determine characteristics of objects and/or areas that are proximate to a user and that are suitable and/or available for a communication.

By way of example, the characteristics include, but are not limited to, a size of the object and/or area, a shape of the object and/or area, an identification of the object and/or area, a description of the object and/or area, a distance from the user to the object and/or area, a noise level at the object and/or area, ambient conditions at the object and/or area, whether the object and/or area is occupied with another person, whether another person is proximate to the object and/or area, costs to use or rent the object and/or area, user preferences, previous user selections of objects and/or areas, and other factors or characteristics discussed herein.

Block 310 states compare the characteristics of the different objects and/or areas.

For example, each object and/or area includes a tally, a weight, or a score with respect to each of the characteristics. A comparison is performed with respect to one or more of the characteristics of each of the objects and/or areas.

Block 320 states select one of the objects and/or areas based on the comparison of the characteristics of the objects and/or areas with each other.

By way of example, selection of an object and/or area over other objects and/or areas is based on scores of the objects and/or areas (e.g., select an object and/or area with a best or highest score), an existence of a characteristic (e.g., select an object and/or area that includes a certain characteristic), and missing a characteristic (e.g., select an object and/or area that does not include a certain characteristic).

Block 330 states process the selection of the object and/or area.

By way of example, process includes, but is not limited to, display, store, map, build, transmit, and/or execute.

Consider an example in which an electronic device includes a location recommender that determines different characteristics of objects and areas that are proximate to a user and/or the electronic device. The location recommender stores or maintains a list of recommended, preferred, available, and/or suitable objects and/or areas as the user moves from one location to another location. When the electronic device commences a communication (such as initiates a communication with another electronic device or receives a communication from another electronic device), the location recommender provides an immediate recommendation or selection of an object and/or an area for an image during the communication.

In an example embodiment, location recommenders of different electronic devices share data with each other. Consider an example in which a first electronic device of a first person includes a location recommender that gathers location information while the first electronic device and first person are located in a northern section of a large shopping mall. A second electronic device of a second person includes a location recommender that gathers location information while the second electronic device and second person are located in a southern section of the shopping mall. These two electronic devices share information via a peer-to-peer network or via a central or common server. When the first person walks to the southern section of the shopping mall, the first electronic device already has a map of locations of suitable and available locations for placing images during a communication. Likewise, when the second person walks to the northern section of the shopping mall, the second electronic device already has a map of locations of suitable and available locations for placing images during a communication.

An example embodiment can select an object and/or area based on one or more factors other than or in addition to the characteristics of the object and/or area. For example, such factors include, but are not limited to, an identification of the person with whom the user is communicating, content or context of the communication, a location of the user and/or the person with whom the user is communicating, a make or model or type of electronic device of the user and/or the person with whom the user is communicating, a time of day, a day of the week, a calendar date, a desired level of privacy of the communication, an age of the user and/or the person with whom the user is communicating, a relationship between the user and the person with whom the user is communicating, a length of time or duration of the communication, a size or shape of the image, and other factors or characteristics discussed herein.

Consider an example in which an electronic device of a user receives an incoming telephone call from a friend with another electronic device. A location recommender determines two possible locations to display an image of the friend during the telephone call. In a first location, the friend would be displayed to stand in front of the user during the telephone call. In a second location, the friend would be displayed to sit in an empty chair next to the user during the telephone call. Both locations are available and have sufficient size and shape to accommodate an image of the friend. The location recommender selects the second location over the first location since the caller is a friend of the user, and the conversation is predicted to endure for several minutes or longer. The second location is selected also based on the fact that the user is sitting in a chair next to the empty chair, and the location recommender desires to match an orientation of the friend with an orientation of the user (i.e., it is preferred to have the image of the friend sitting during the call since the user is also sitting during the call).

Figure 4:
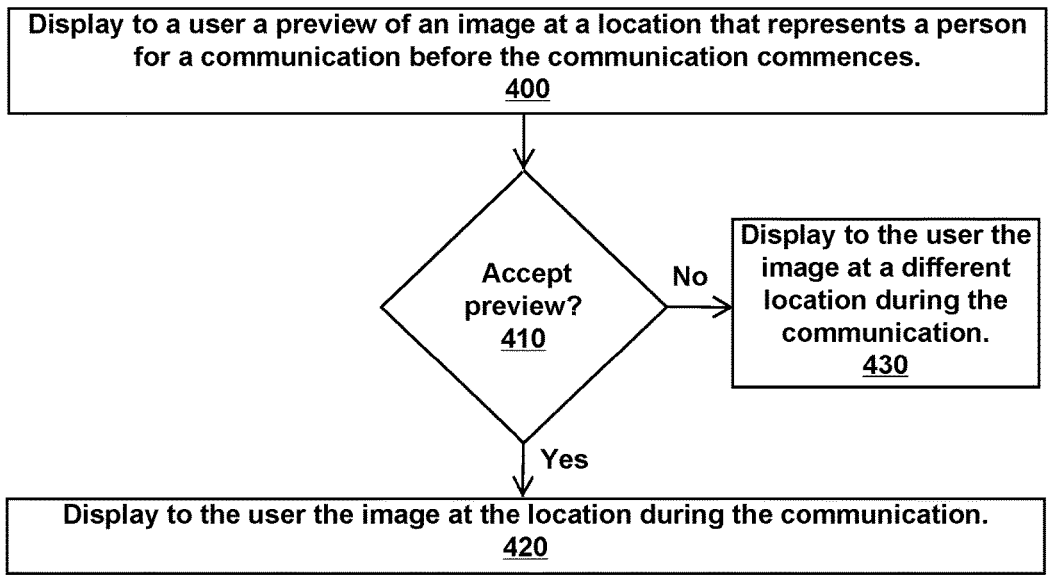
FIG. 4 is a method to display a preview of an image during a communication in accordance with an example embodiment.

FIG. 4 is a method to display a preview of an image during a communication.

Block 400 states display to a user a preview of an image at a location that represents a person for a communication before the communication commences.

For example an electronic device of a user displays the image to a location in empty space before the communication commences between two or more people. The preview of the image shows the user on the communication where the image will be placed during the communication and what image will be displayed to represent the other person during the communication. The preview can include other information including, but not limited to, a name of the person (e.g., a name of a caller), a picture of the person (e.g., a picture, image, or video of the caller), a location of the person (e.g., where the caller is located), a time of day, other available and/or suitable locations to include the image, information about the person (e.g., personal information about the caller), and other information.

When an electronic device receives an incoming call, the electronic device notifies the user of the incoming call (such as vibrating or generating a ring tone). In an example embodiment, the electronic device displays an image that represents the other person (e.g., the caller) to notify the user of a pending call (e.g., an incoming or outgoing call). The electronic device displays the image at the location or a possible location where the image will be displayed when the call commences. As such, the user has a preview of the caller and the location.

Consider an example in which a WED of a user receives a phone call from a friend. Instead of generating a ring tone or in addition to generating the ring tone, the WED displays an image of the friend. This image of the friend is oriented and sized to appear in a doorway that is located in front of the user. If the user accepts the call, then the user talks to the image in the doorway and hence to the friend. Alternatively, if the user rejects the call, then the image of the friend in the doorway disappears.

Block 410 makes a determination as to whether the user accepts the preview of the image at the location for the communication. If the answer is "yes" then flow proceeds to block 420 that states display to the user the image at the location during the communication. If the answer is "no" then flow proceeds to block 430 that states display to the user the image at a different location during the communication.

If the user accepts the preview location, then the communication proceeds with the image at the preview location. If the user does not accept the preview location, then the communication proceeds with the image at a different location. Alternatively, the communication can end or not be accepted (e.g., the call is rejected, sent to voicemail, etc.).

Consider an example in which an electronic device of a user receives an incoming request for a video call from another electronic device of his brother. The user stands in a room next to an empty chair. Instead of ringing, the electronic device displays an image of the brother, and this image appears to the user to be located on the chair next to the user. If the user accepts the incoming request, then the video call proceeds with the image of the brother being displayed to appear on the chair. The user talks to this image that represents the calling party (i.e., the brother). During the conversation, a friend of the user walks into the room and sees the user talking to an empty chair that is next to the user. The friend does not see the image of the brother since the image appears to the user and not to others.

Consider still the example in which the user receives a call from his brother. Instead of accepting the incoming request at the preview location, the user selects a couch as a different or alternate location for the call. The couch is located near the user, and the video calls proceeds with the image of the brother being displayed to appear on the couch.

In an example embodiment, an electronic device includes a user interface that interacts with or interfaces with the user to accept, to change, to reject, or to move an image and/or a location for the image for a communication. As an example, an electronic device places a preview image at a location to notify a user of an incoming and to show the user where the image representing the calling person will be placed if the incoming call is accepted or answered. The user provides a voice instruction, a hand gesture, or otherwise interacts with the electronic device to instruct the electronic device to accept the call at the location, reject the call, or accept the call but move the image to another location. The user and/or electronic device can select an alternate location for the image.

Consider an example in which a user wears electronic glasses and initiates a phone call to another person. The electronic glasses display a preview of a 3D image of the other person in empty space near the user before commencing the communication between electronic glasses of the user and the other person that is remote from the user. The electronic glasses determine whether the user accepts the preview of the 3D image at the location in the empty space and displays the 3D image in the empty space when the user accepts the preview of the 3D image.

Figure 5:
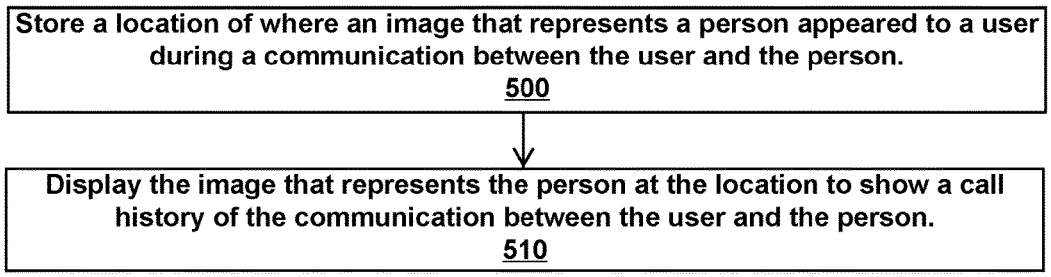
FIG. 5 is a method to display an image at a location to show a call history of a prior communication in accordance with an example embodiment.

FIG. 5 is a method to display an image at a location to show a call history of a prior communication.

Block 500 states store a location of where an image that represents a person appeared to a user during a communication between the user and the person.

During a communication between the user and the person, an image that represents the person exists for the user at a location (such as a location in empty space, on or near an object, as an object, etc.). An electronic device determines and/or stores this location of where the image existed or where the image appeared to exist to the user. The electronic device can also store other information associated with or related to the communication including, but not limited to, the image that represented the person during the communication, a location of the user during the communication, an orientation of the image during the communication, a location of the person during the communication, the location of rejected or accepted locations during the communication, call history information, an audio and/or video recording of the call, and other information discussed herein.

Block 510 states display the image that represents the person at the location to show a call history of the communication between the user and the person.

The electronic device stores a location of where a user made a call and a location of where the image representing the other person was located during the call. This information is included in a call history or communication history for the user.

Consider an example in which an electronic device of a user makes a first communication in which the user calls his friend while the user is in a family room of his house. The communication lasts for several minutes, and the electronic device displays an image of the friend to the user on a chair located in the family room. Later that day, the electronic device of the user makes a second communication in which the user calls his father while the user is in the family room of his house. The communication lasts for an hour, and the electronic device displays an image of the father to the user on a sofa located in the family room. During the next day, the user reviews a call log or communication history of calls to and/or from the electronic device. The electronic device displays the image of the friend on the chair and the image of the father on the couch to show these two calls. The electronic device can display other information as well including, but not limited to, an image of the user to show where the user was located during each communication, movement of the user or different locations of the user during each communication, movement of the image or different locations of the image during the communication, a time of the communication, a date of the communication, a duration of the communication, a replay of the communication (such as replaying audio and/or video of the communication), and other information discussed herein.

Consider an example in which an electronic device includes a location module that stores locations of objects and/or areas that previously included images of people with whom a user engaged in previous communications with the electronic device. These images and their locations are stored as part of a call history. Later, the images are reproduced or re-displayed to appear at their respective locations so a user can see where these images appeared during prior communications.

Consider an example in which an electronic device of a user receives a phone call from a person while the user is located in an office. During the phone call, a display of the electronic device displays or projects an image that represents the person such that the person appears to be standing in front of a desk in the office. The user talks to the image of the person and the call ends. The electronic device stores or records a coordinate or Global Positioning System (GPS) position of the location of the image in front of the desk and other information associated with or related to the call. Several weeks later, the user returns to the office and interacts with the electronic device to retrieve a call history that shows the previous call with the person. The electronic device displays the person such that the person appears to be standing in front of the desk in the office. An orientation and location of the image of the person emulate or copy the orientation and location of the image of the person during the call that occurred several weeks earlier. Upon seeing the image of the person standing in front of the desk, the user remembers the call and talking with the person. Thus, the visual reproduction of the image at the same location assists the user in remembering the call.

Figure 6:
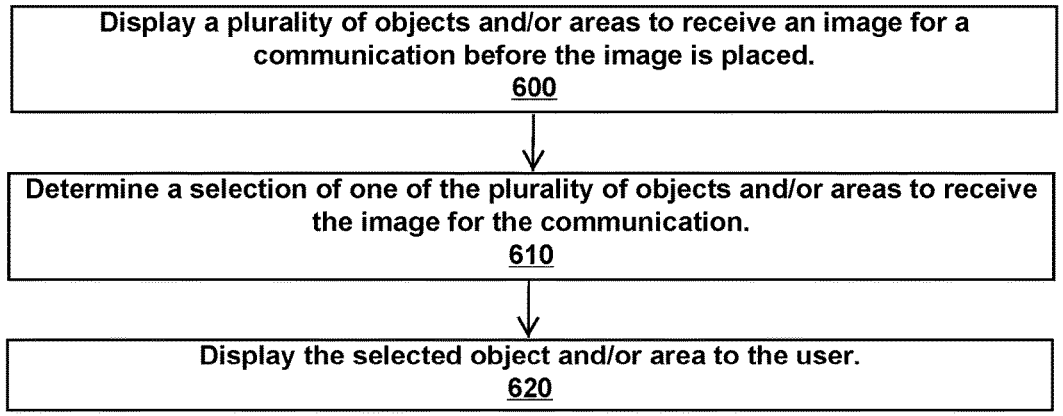
FIG. 6 is a method to display multiple locations to place an image during a communication in accordance with an example embodiment.

FIG. 6 is a method to display multiple locations to place an image during a communication.

Block 600 states display a plurality of objects and/or areas to receive an image for a communication before the image is placed.

In an example embodiment, an electronic device simultaneously displays a plurality of different objects and/or areas that are available and/or suitable to receive an image during a communication. As one example, the objects and/or areas are highlighted, marked, identified, visually distinguished, or shown on the display so a user can see what objects are available and/or suitable to receive an image. Further, areas can be shown so a user can not only visually identify or locate the area but also visually determine a size and/or shape of the areas. For instance, a 3D perimeter or outline on the display shows a size and a shape of an available and/or suitable area.

In an example embodiment, the areas are displayed or identified before they receive an image. Objects can also be identified as being suitable and/or available for an image before the image is placed at, on, or near an object.

Consider an example in which a user desires to conduct a telephone call with two other people and enters a large coffee shop that includes seated and standing customers, couches, benches, and various sets of tables and chairs. With a naked eye, the user cannot determine which objects and/or areas are available to receive an image of the two other people during the telephone call since some areas may be taken, reserved, or otherwise not available. An electronic device of the user communicates with a server and/or other electronic devices in the coffee shop and retrieves a map that shows available areas and/or objects for the communication. For example, the map includes locations of the areas, sizes of the areas, shapes of areas, times that the areas are available, and other information discussed herein. The map can also identify which objects located in the coffee shop are available to receive an image for a communication. The electronic device displays this map to the user so the user can see where the areas and objects are located in the coffee shop and also see a size and shape of the areas. Since the area will include images of two other people during the telephone call, the user selects one of the areas and reserves this area for the telephone call. Alternatively, the use could select one or more available objects (such as reserving two chairs at a table).

Block 610 states determine a selection of one of the plurality of objects and/or areas to receive the image for the communication.

An electronic device and/or a user select one or more of the objects and/or areas for the communication. For example, the electronic device automatically selects an object (e.g., a chair) or an area (e.g., a location near a window or an area on a flat surface or wall) where an image of a caller will be shown during the communication. As another example, the user interacts with the electronic device to select one or more of the objects and/or areas.

Block 620 states display the selected object and/or area to the user.

An electronic device displays the selected object and/or area so the user and/or other people can see one or more of its location, size, shape, coordinates, cost, time available, time unavailable, distance from the user, and other information discussed herein.

By way of example, when an object is selected, a visual indication appears on a display of an electronic device to notify a user that the object is selected. For instance, a user interacts with an electronic device to select a table and a chair that are located in a room. Thereafter, when a camera in an electronic device captures the table and the chair, a display of the electronic device shows a visual indication of the selection of the table and the chair. For instance, a perimeter of the table and the chair are highlighted with color. As another example, an arrow or other visual indication on the display points to the table and chair to indicate their selection. As yet another example, a display or view of the camera shows the selection of the table and chair. For instance, when a user looks thru the camera and sees the table and the chair, they are visually marked to indicate the selection.

Consider an example in which a user desires to call his friend while in a crowded shopping center. The user is not certain where to place this call since the shopping center has many people and someone would likely walk thru or occupy the area where an image of his friend is being displayed. An electronic device of the user displays locations where the user can stand or sit and place the call. These locations include or are proximate to areas where the electronic device will display or project the image of the friend during the call.

People may desire to talk to each other while both parties to the communication are in a similar or a same orientation. For example, during the communication, both people are standing, sitting, or performing a similar activity (e.g., both people are walking; both people are jogging; both people are riding a bicycle; both people are sitting in a car; both people are standing next to each other; etc.).

One example embodiment orients an image of a person to a communication so both parties to the communication are in a similar or same orientation. A first person on the communication views an image of a second person on the communication such that the image of the second person matches the orientation and/or activity of the first person. At the same time, the second person on the communication views an image of a first person on the communication such that the image of the first person matches the orientation and/or activity of the second person. As such, the first person sees an image of the second person with an orientation and/or activity that matches the first person, and the second person sees an image of the first person with an orientation and/or activity that matches the second person.

Figure 7:
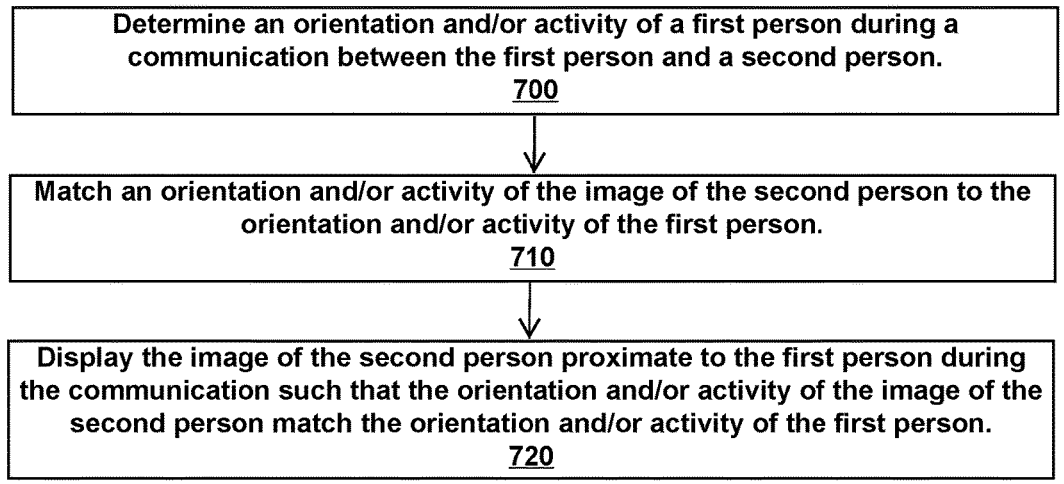
FIG. 7 is a method to match an orientation of an image with an orientation of a person during a communication in accordance with an example embodiment.

FIG. 7 is a method to match an orientation of an image with an orientation of a person during a communication.

Block 700 states determine an orientation and/or activity of a first person during a communication between the first person and a second person.

By way of example, an electronic device measures and/or senses an orientation and/or activity of a person. For instance, an electronic device on the person measures and/or senses one or more of an inclination of the person, a direction of movement of the person, a direction of gaze of the person, a direction that the person is facing, a rate of movement of the person, a height of the person from the ground, and movement of the person. As another example, the electronic device captures images of the person and/or a surrounding location of the person and utilizes imagery analysis to determine an orientation and/or activity of the person. As another example, GPS location or location identification indicates an orientation and/or activity of the person.

Consider an example in which an electronic device includes an orientation and/or activity determiner or module that includes one or more of a compass, an accelerometer or acceleration monitor, a GPS locator, a physiology monitor (e.g., a monitor that measures heart rate, breathing, body temperature, etc.), a light sensor, a temperature sensor, a color sensor, rotational vector sensor, gravity sensor, a photometer sensor, activity monitor (e.g., a wearable sensor), an activity recognizer (e.g., a sensor and/or camera, such as in an HPED), a pedometer, a proximity sensor, an orientation sensor, a geomagnetic field sensor, a fitness tracker, magnetometer, barometric sensor, a gyroscope, an inertia measuring sensor, and other monitors and sensors.

Block 710 states match an orientation and/or activity of the image of the second person to the orientation and/or activity of the first person.

The image of the second person is altered, modified, processed, corrected, rotated, updated, or built so it matches an orientation and/or activity of the first person. If the image already matches an orientation and/or activity of the first person, then changes or alterations to the image may not occur.

Block 720 states display the image of the second person proximate to the first person during the communication such that the orientation and/or activity of the image of the second person match the orientation and/or activity of the first person.

During the communication, the orientation and/or activity of the image of the second person matches, resembles, copies, and/or emulates the orientation and/or activity of the first person. This image exists or appears to exist proximate to the person to the communication (e.g., an image of the second person appears to exist next to or near to the first person to the communication).

Consider an example in which a first person (who is standing) telephones a second person (who is sitting). An electronic device of the first person determines that the first person is standing and hence displays an image of the second person to be standing next to the first person during the telephone call. At the same time, an electronic device of the second person determines that the second person is sitting and hence displays an image of the first person to be sitting next to the second person during the telephone call.

Consider an example in which a first person (who is walking outdoors in a compass direction of North) telephones a second person (who is eating dinner). An electronic device of the first person determines that the first person is walking in the direction of North and displays an image of the second person to be walking next to the first person during the telephone call. The image of the second person walks outdoors in the compass direction of North so both the first person and the image of the second person face and walk in the direction of North.

An example embodiment makes a determination as to whether an object and/or area exist such that the orientation and/or activity of the image of the second person can match the orientation and/or activity of the first person. If the orientation and/or activity cannot be matched, then the image of the second person is displayed with an alternate orientation and/or activity.

Consider an example in which a first person sits in an office and receives an incoming telephone call from a second person. An electronic device of the first person is configured with a preference to orientate images of incoming calls to match an orientation of the first person. The office, however, does not include an empty chair or other object on which to position a sitting image of the second person. In this case, the electronic device places an image of the second person to be standing in front of the first person sitting on the chair. Alternatively, the electronic device provides an image of chair, and places the image of the second person to be sitting in the image of the chair.

Figure 8:
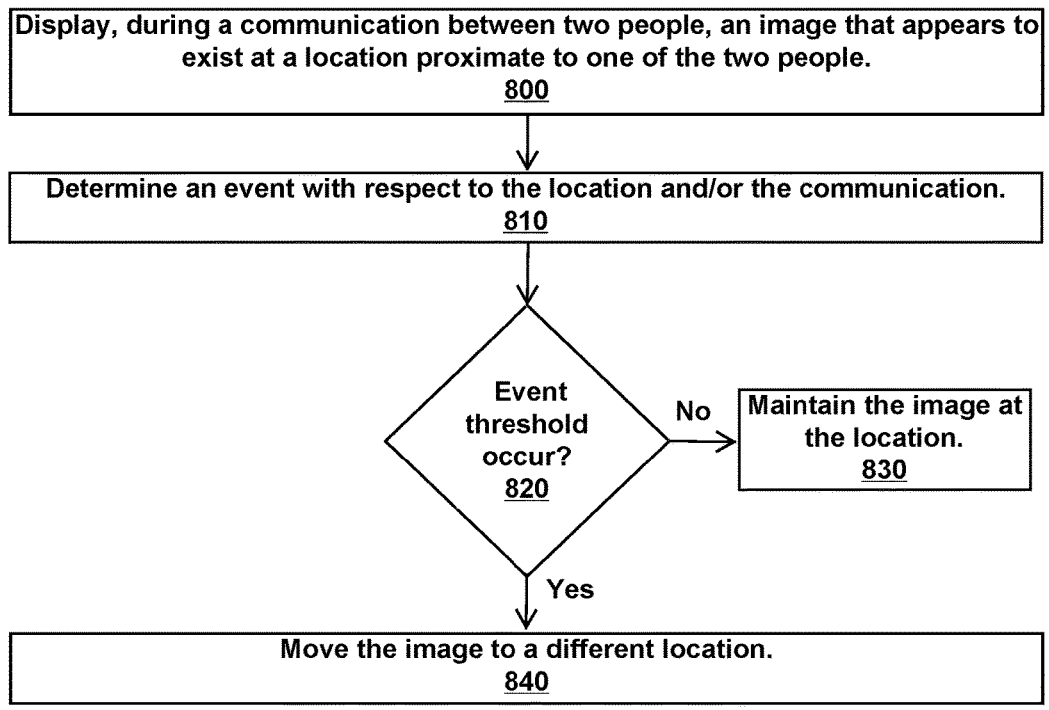
FIG. 8 is a method to move an image to a different location during a communication in accordance with an example embodiment.

FIG. 8 is a method to move an image to a different location during a communication.

Block 800 states display, during a communication between two people, an image that appears to exist at a location proximate to one of the two people.

While electronic devices of the two people communicate with each other, an electronic device of one person displays or provides an image that represents the other person. For example, the electronic device of the one person presents this image to exist at a location that is proximate to the one person. For instance, the image appears on or thru a see-thru display of the electronic device of the one person. As another example, the electronic device projects the image or provides a virtual image of the person.

Block 810 states determine an event with respect to the location and/or the communication.

For example, an electronic device determines the occurrence of an event at or near the location or during the communication. Events include, but are not limited to, one or more of an electronic device determining a person, animal, or thing moving to or near the location (e.g., a person walking into a space that includes the location), the location moving out of a field of view (e.g., the location moves out of a field of view to a person participating in the communication), occurrence of a time period (e.g., expiration of a predetermined amount of time), instructions from a user (e.g., a user interacts with the electronic device to move the location), cost or fee (e.g., a charge for using the location causes the electronic device to move the image to a free location or less expensive location), noise (e.g., excess noise at the locations causes the electronic device to move the location to a quieter place), lighting (e.g., excessive brightness or low lighting causes the electronic device to move the location), privacy (e.g., the electronic device moves the location because third parties not participating in the communication can hear the conversation of the participating parties), ambient conditions (e.g., the electronic devices moves the location due to unwanted wind, temperature, heat, cold, etc.), and inadequate reception or communication quality (e.g., the electronic devices moves the location to improve the sound and/or video quality of the communication).

Block 820 makes a determination as to whether an event threshold occurs with respect to the event. If the answer to this determination is "no" then flow proceeds to block 830 that states maintain the image at the location. If the answer to this determination is "yes" then flow proceeds to block 840 that states move the image to a different location.

Occurrence of an event threshold causes movement of the image from one location to another location. The event threshold can occur simultaneously or concurrently with the event. Alternatively, the event threshold can occur after the event.

As one example, an electronic device moves the location where the image appears when another person moves into the location. For instance, during a telephone call, an image of a caller appears on an empty chair that is located in a room. A third party (not a party to the communication) is unaware that an image is being displayed to appear on the empty chair, sits on the chair, and blocks or disrupts the image from being displayed to sit on the chair. The electronic device moves the image upon the occurrence of the event (i.e., upon the occurrence of the third party sitting on the chair, the electronic device moves the image to another chair that is empty). Alternatively, the electronic device could move the image after the occurrence of a time period. For instance, after the third party sits on the chair, the electronic device waits for a period of time to see if the third party will move. If the third party does not move after expiration of the period of time, then move the image to a new location (e.g., move the image to a new location after expiration of time, such as after ten seconds or twenty seconds or thirty seconds or one minute).

As another example, a user sits at a desk and wears electronic glasses with a see-thru display. During a phone call, these glasses display an image of a caller that appears to be located in front of the desk. The user, however, moves his head to his right until the location of the caller in front of the desk is no longer in a field of view of the user. In response to this movement and image no longer appearing in the field of view, the electronic glasses immediately move the location of the image to be next to the desk so the image at its new location is in the field of view of the user. Alternatively, the electronic glasses do not move the location of the image, or they move the location of the image after expiration of a predetermined amount of time.

As another example, an electronic device of a first user displays or projects an image that represents a second user during a voice and video communication between the two users. This image appears next to the first user (e.g., analogous to two people standing next to each other during a conversation). When the first user moves, the location of the image also moves such that the image tracks or follows the first user. The image continues to appear to be next to the first user (e.g., analogous to two people walking side-by-side and talking to each other).

As another example, an image of a person appears at a first location during a communication. A user moves his hand (e.g., an event), and an electronic device determines this movement as a hand gesture that instructs the electronic device to move the image from the first location to a second location that is indicated in the hand gesture.

As another example, a microphone on a smart phone captures sound levels at different locations and maps these sound levels to the locations. When the sound level at current location exceeds a decibel threshold during a communication, the electronic device recommends a new or different location with a sound level below the threshold.

Figure 9:
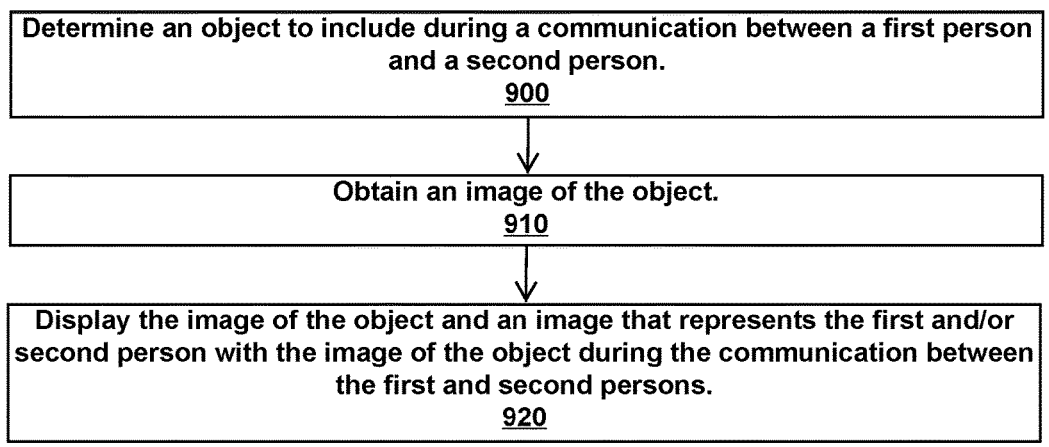
FIG. 9 is a method to determine an object to display during a communication in accordance with an example embodiment.

FIG. 9 is a method to determine an object to display during a communication.

Block 900 states determine an object to include during a communication between a first person and a second person.

During a communication between the first person and the second person, an electronic device with the first person displays an image that represents the second person at a location near the first person. The image that represents the second person can include one or more objects. An electronic device can determine whether or not to display such an object or objects and determine which object or objects to include along with the image that represents the second person.

By way of example, the object is selected randomly, selected per instructions from a user (such as the first and/or second person), obtained from a database of images or video, selected based on selections from previous or historical communications, captured from video of a field of view of a user, selected based on a location of a user, selected based on an activity of a user, selected as being associated with a user, identified as being at or near a location of a user, selected to emulate or copy a user, or selected in another manner.

Block 910 states obtain an image of the object.

For example, an electronic device captures an image of the object; the object is retrieved from memory or storage; or an electronic device builds or generates the image of the object.

Consider an example in which the first and second persons engage in a telephone call. A camera in an electronic device of the second person captures an image of the second person sitting in a chair in an office. The image is edited to remove a background of the office so an edited version of the image includes the second person sitting in the chair with other objects removed. The electronic device provides this image of the second person sitting in the chair to the electronic device of the first person, and this image is displayed to the first person.

Block 920 states display the image of the object and an image that represents the first and/or second person with the image of the object during the communication between the first and second persons.

Consider an example in which the first person rides a bicycle and initiates a phone call to the second person. An electronic device of the first person determines that the first person is riding a bicycle, retrieves an image of the second person, retrieves an image of a bicycle, and generates an image of the second person on the bicycle. During the phone call, the electronic device displays an image of the second person the bicycle while the first person rides his bicycle. Thus, from the point of view or field of view of the first person, the first person talks to the second person while both the first and second persons ride bicycles.

Consider an example in which an electronic device includes an object recognition module that identifies objects with or proximate to a user. An image of a user is superimposed onto or edited to include the object, and the image is displayed to a user.

Consider an example in which a camera of an electronic device of a first user captures an image of a chair before the first user sits in the chair. The electronic device then initiates a call to a second user but a real-time image of the second user or her location is not available. The electronic device retrieves an archive or stored image of the second user, executes photographing editing software to position the image of the second user on the chair, and displays the image to the first user during the call. From a point of view of the first user, the first user talks to the second user while the second user sits in a chair similar to the chair in which the first user also sits.

Figure 10:
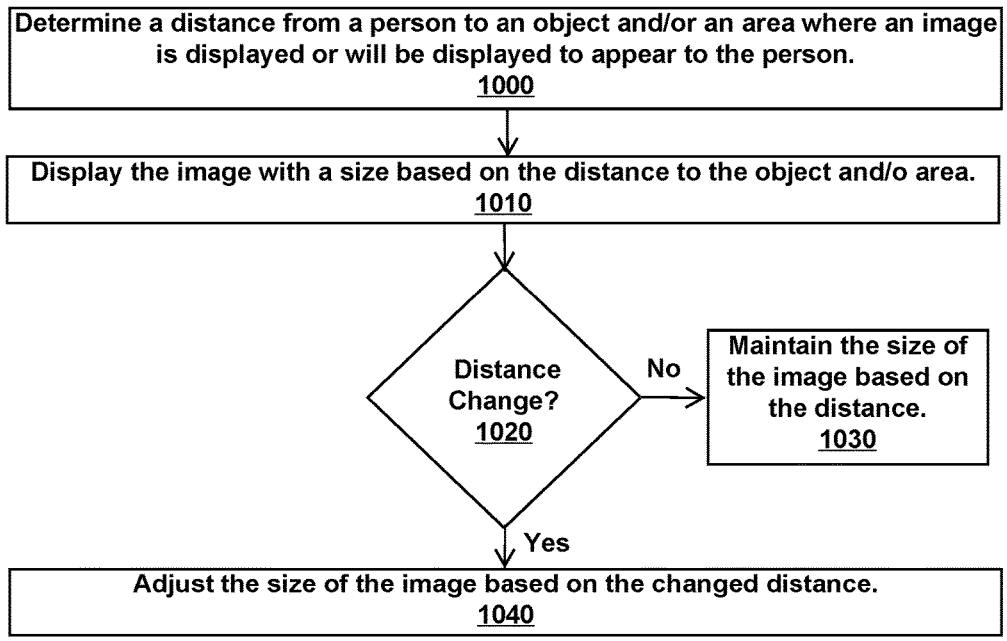
FIG. 10 is a method to adjust a size of an image based on a distance in accordance with an example embodiment.

FIG. 10 is a method to adjust a size of an image based on a distance.

Block 1000 states determine a distance from a person to an object and/or an area where an image is displayed or will be displayed to appear to the person.

An electronic or mechanical device measures a distance from the person and/or from an electronic device to the object and/or the area. By way of example, an electronic device includes a distance module or distance determiner that includes one or more of a laser, a sensor, a rangefinder, a scope, a camera, a GPS determiner, a radio transmitter and/or receiver, or another electronic device to measure or determine distance.

The electronic or mechanical device used to measure distance can be a separate device (such as a standalone device) or device integrated with or attached to another electronic device. For example, electronic and/or mechanical devices in one or more of a wearable electronic device (WED), handheld portable electronic device (HPED), computer, server, and a satellite determine a distance to an object and/or area.

Block 1010 states display the image with a size based on the distance to the object and/or the area.

By way of example, image size is inversely proportional to object distance and directly proportional to focal length. As a distance between a user and the object and/or the area increases, the image size of the object and/or the area decreases. As the distance between the user and the object and/or the area decreases, the image size of the object and/or the area increases. As another example, the size of the object and/or the area relates to a distance of the electronic device and/or person to the object and/or the area.

Images can also be displayed based on a range of distances. For example, images are displayed with a first size given distances in a first range; images are displayed with a second size given distances in a second range; images are displayed with a third size given distances in a third range; etc. As another example, images are displayed with a predetermined size (e.g., a size that remains constant or a size that changes). As another example, the size of the displayed image is proportional to or relates to the distance of the electronic device to the location where the image appears to exist to the viewer.

Block 1020 makes a determination as to whether the distance from the person to the object and/or area changes. If the answer to this determination is "no" then flow proceeds to block 1030, and the size of the image is maintained based on the distance. If the answer to determination is "yes" then flow proceeds to block 1040, and the size of the image is adjusted based on the changed distance.

Consider an example in which a user sits at a table with chairs. One of the chairs is empty or unoccupied and is across the table in front of the user. The user holds an electronic device (such as a tablet computer or a smart phone) with a camera that captures video of the empty chair. A display on the electronic device displays this video such that the user sees the empty chair on the display while holding the electronic device. The electronic device also includes a distance module that determines a distance to the empty chair and an image placement module that selects the empty chair as a location to place an image of a friend of the user during a telephone call. When the user telephones his friend, the electronic device places images of the friend to appear on the chair and adjusts sizes of these images in proportion to the distance to the chair. During the phone call, the user holds the electronic device such that the camera captures video of the chair while the display simultaneously displays images (pictures or video) of the friend such that the friend appears to be sitting on the chair. A size of the friend is proportional to the distance to the chair and a size of the friend. From the point of view of the user, the user sees on the display his friend sitting on the chair across the table. The chair and table are real (i.e., they actually exist near the user), and the image of the friend is not real (i.e., it exists on or thru the display of the electronic device).

An example embodiment adjusts the size of the image in real-time to coincide with changes in distance from the user to the object and/or area. For example, as a user moves away from a location in empty space where an image appears to exist on a display of a WED or a HPED of the user, a size of the image becomes smaller. As the user moves toward the location in empty space where the image appears to exist on the display of the WED or the HPED, the size of the image becomes larger.

Figure 11:
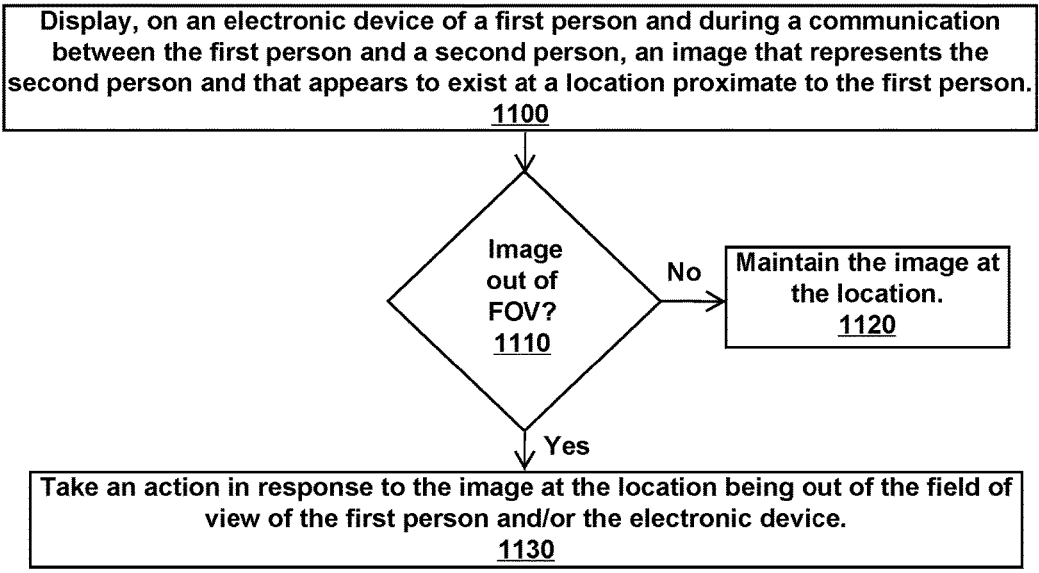
FIG. 11 is a method to display an indication of a location of an image in accordance with an example embodiment.

FIG. 11 is a method to display an indication of a location of an image.

Block 1100 states display, on an electronic device of a first person and during a communication between the first person and a second person, an image that represents the second person and that appears to exist at a location proximate to the first person.

While the electronic device of the first person communicates with an electronic device of the second person, a display on the electronic device of the first person displays or generates an image that represents the second person. This image appears to exist at a physical location that is proximate to the first person.

Block 1110 makes a determination as to whether the image at the location proximate to the first person is out of a field of view (FOV) of the first person and/or the electronic device of the first person. If the answer to this determination is "no" then flow proceeds to block 1120, and the image is maintained at the location. If the answer to this determination is "yes" then flow proceeds to block 1130, and the electronic device of the first person takes an action in response to the image at the location being out of the field of view of the first person and/or the electronic device.

When the field of view of the user and/or the electronic device no longer includes the object and/or location where the image appears, then the electronic device initiates an action. By way of example, this action includes, but is not limited to, provide a notification that the image is not within the field of view (e.g., display a notice or provide an audible sound or warning), display an indication of the location of the image, automatically move the image to a different object and/or location within the field of view, resize the image, alter or move the field of view to include the object and/or location where the image exists (such as changing a camera angle or moving an electronic device toward the object and/or location), commence a timer or clock, alter sound emanating from the electronic device, discontinue a mode of operation that displays an image to appear at an object and/or location (such as temporarily or permanently stopping the mode of operation), display the image or a different image on the electronic device so the image appears in front of the user, move the image to a perimeter of the field of view, display a smaller image (such as displaying a thumbnail of the image), or take an action that notifies the user that the field of view does not include the object and/or location where the image existed.

By way of example, the electronic device provides an indication that the image or the location where the image appears to exist is not currently in the field of view of the user and/or the electronic device. This indication includes, but is not limited to, a compass direction of where the object and/or location with the image is located, a heading providing a direction or location where the object and/or location with the image is located, an arrow or pointer pointing or showing where the object and/or location with the image is located, an image notifying the user, a map showing where the object and/or location with the image is located, text providing a notice or instructions where the object and/or location with the image is located, blinking or flashing light, a symbol, an object, indicia, or visual indication. The indication can also include an audio indication and other information relating to the object, the image, and/or the location (such a distance to the object and/or location, a direction showing which way to look or move a head to place the object and/or location back into the field of view, a volume level of the other party to the communication, a thumbnail of the image, and a scaled or smaller view of the image).

Consider an example in which a user wears electronic glasses that display an image of a caller at a location during a phone call. The image of the caller appears to be standing in a doorway that is located in front of the user. As the user moves his head, the image remains standing in the doorway while the doorway is in a field of view of the user while the user looks through the electronic glasses. When the user turns his head far enough to one side, the doorway is no longer in his field of view. At this moment, the user can no longer see the image since the image exists in the doorway. The electronic glasses display an indication to notify the user that the image is no longer in a field of view of the user.

This indication also provides the user with a location and/or direction of where to look in order to see the image. For instance, an arrow on the display of the electronic glasses informs the user to look toward his right that is in the direction of the doorway. When the user turns his head back to the doorway, the image reappears on or thru the display and the arrow disappears.

Consider an example in which an electronic device includes a field of view (FOV) module that determines a direction of a field of view of the electronic device and/or the user. For example, the FOV module determines which direction the electronic device is pointed or aimed or which direction a head of a user and/or eyes of a user are directed. The FOV module also determines which objects are in the field of view. When the field of view no longer includes the object and/or the location where the image appears to exist, then a display displays an indication of a location of the object and/or image. For example, the display instructs the user to move his head or to move the electronic device in a particular direction to adjust the field of view to include the image.

An example embodiment includes a timer, a clock, or a clock module that tracks how long the field of view does not include the object and/or location with the image. An action commences upon expiration of a predetermined time (such as upon reaching three seconds, five seconds, ten seconds, thirty seconds, one minute, two minutes, or another amount of time). A display of the electronic device displays an indication that the location of the image will change to a different location that is in the field of view. This indication can include a clock or timer (such as a visual countdown showing minutes and/or seconds when the image will relocate). For instance, the display shows an amount of time remaining until the image moves to a different location and/or an amount of time that has elapsed with the image not being in the field of view.

As one example, during a phone call between a user and his friend, the user wears electronic glasses and moves his head such that his field of view does not include a location in empty space where an image of his friend appears. A red light appears on the display of the electronic glasses to indicate that the image of the friend is no longer in the field of view of the user. After a period of ten seconds (shown as a clock or counter on the display), the image of the friend moves to a new location in empty space that is within the field of view of the user.

An example embodiment moves the image in response to the field of view moving to not include the object and/or location with the image. The image moves to a different location that is within the field of view. Movement of the image can occur after a time delay or immediately when the image and/or location of the where the image appears to exist is not within the field of view. For example, when the electronic device moves such that the field of view no longer includes the location of the image, then the electronic device moves or repositions the location of the image within the field of view.

Consider an example in which a user sits at a table and holds a handheld portable electronic device (HPED) with a camera and a display that displays real time video of a field of view of the camera. This field of view includes the table where the user sits and an empty chair across from the user. When the user receives a phone call from his colleague, the HPED displays an image of his colleague sitting on the empty chair. As the HPED moves while in the hand of the user, the image of the colleague remains positioned on the chair. When the HPED moves far enough such that the field of view of the camera does not include the chair, then the HPED takes an action. For example, the HPED repositions the image to a different location (such as moving the image to appear on another chair, moving the image to appear standing at a location in empty space near the user, notifying the user, etc.).

In an example embodiment, movement of the field of view does not affect movement of the image as long as the image remains in the field of view. When the field of view moves to a location that no longer includes the image and/or the location of the image, then an action occurs. For example, when the electronic device jiggles, the image does not also jiggle but remains stationary or unaffected by the jiggling movement.

In another example embodiment, movement of the field of view does affect movement of the image even though the image remains in the field of view. For example, the electronic device displays the image to remain at a constant or consistent location on the display. For instance, the electronic device displays the image in a central location on the display. When the field of view changes, the location of where the image appears contemporaneously changes so that the image remains in the central location on the display.

Figure 12:
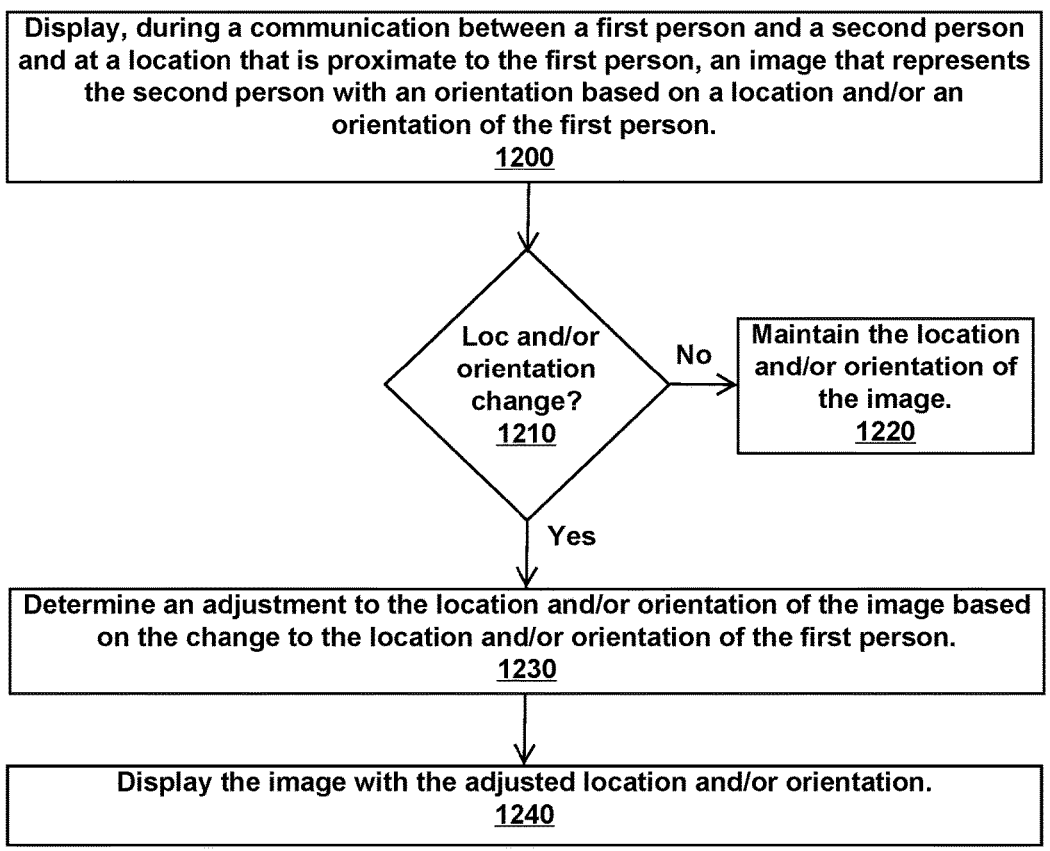
FIG. 12 is a method to adjust an orientation of an image displayed to a person during a communication in accordance with an example embodiment.

FIG. 12 is a method to adjust an orientation of an image displayed to a person during a communication.

Block 1200 states display, during a communication between a first person and a second person and at a location that is proximate to the first person, an image that represents the second person with an orientation based on a location and/or an orientation of the first person.

The image of the second person has an orientation that is based on or in response to the location and/or orientation of the first person. For example, an orientation of the second person faces the first person or is directed toward the first person. For instance, a head and/or eyes of the image look at the first person.

Block 1210 makes a determination as to whether the location and/or the orientation of the first person change. If the answer to this determination is "no" then flow proceeds to block 1220 that states maintain the location and/or orientation of the image. If the answer to this determination is "yes" then flow proceeds to block 1230 that states determine an adjustment to the location and/or orientation of the image based on the change to the location and/or orientation of the first person.

Block 1240 states display the image with the adjusted location and/or orientation.

In an example embodiment, the image moves its location and/or orientation in response to movements of the first person. In this manner, the image tracks or follows the first person. For example, one or more body parts of the image move (such as moving eyes of the image, rotating a head of the image, moving a torso or body of the image, etc.). A location of the image can also change (such as moving the image from one location to a different location).

Consider an example in which a first person has a handheld portable electronic device (HPED) that communicates a phone call with a second person that wears electronic glasses that includes or is in communication with a location module, an image placement module, an orientation module, and a display. The image placement module determines a location of an empty space that is proximate to the location of the second person and determines that the empty space is available and void of other images from other electronic glasses. The orientation module communicates with the location module and determines an orientation of a face of the first person to face the location of the second person. The display displays an image of the first person in the empty space during the phone call such that the orientation of the face of the image faces the second person during the phone call. When the second person moves, the location module determines movement of the second person and the electronic glasses away from the location of the empty space and communicates this movement with the orientation module. In response, the orientation module alters the orientation of the face of the image to move and track a location of the second person while the second person moves with respect to the location in the empty space.

Consider an example in which the electronic device determines a direction and a distance from a person to an object and/or a location where the image exists. When the person moves, the direction and/or distance change. A first adjustment to the image occurs based on the change in distance. For example, a size of the image increases when the person moves closer to the object and/or location, and a size of the image decreases when the person moves farther away from the object and/or location. A second adjustment to the image occurs based on the change in direction. For example, one or more portions of the image rotate or move in a direction to follow or track movement of the person.

An amount of movement or adjustment of the image can be based on an amount of movement of the person with respect to the object and/or location where the image exists. For example, when the person is at a first location, the electronic device determines a first direction from the person at this first location to the object and/or location of the image. When the person moves to a second location, the electronic device determines a second direction from the person at this second location to the object and/or location of the image. Movement of the person from the first location to the second location creates an angle that represents an amount or degree of this movement. This angle is used to calculate an amount to move, rotate, or adjust the image.

Consider an example in which a first person faces an image of a second person during a telephone call with the second person. Both the first person and the image of the second person are standing and facing each other. A line of sight of the first person is toward the image, and a line of sight of the image is toward the first person. The first person moves several feet and stands to one side of the image of the second person. A head of the image rotates ninety degrees (90°) so its line of sight is toward the new location of the first person.

Figure 13:
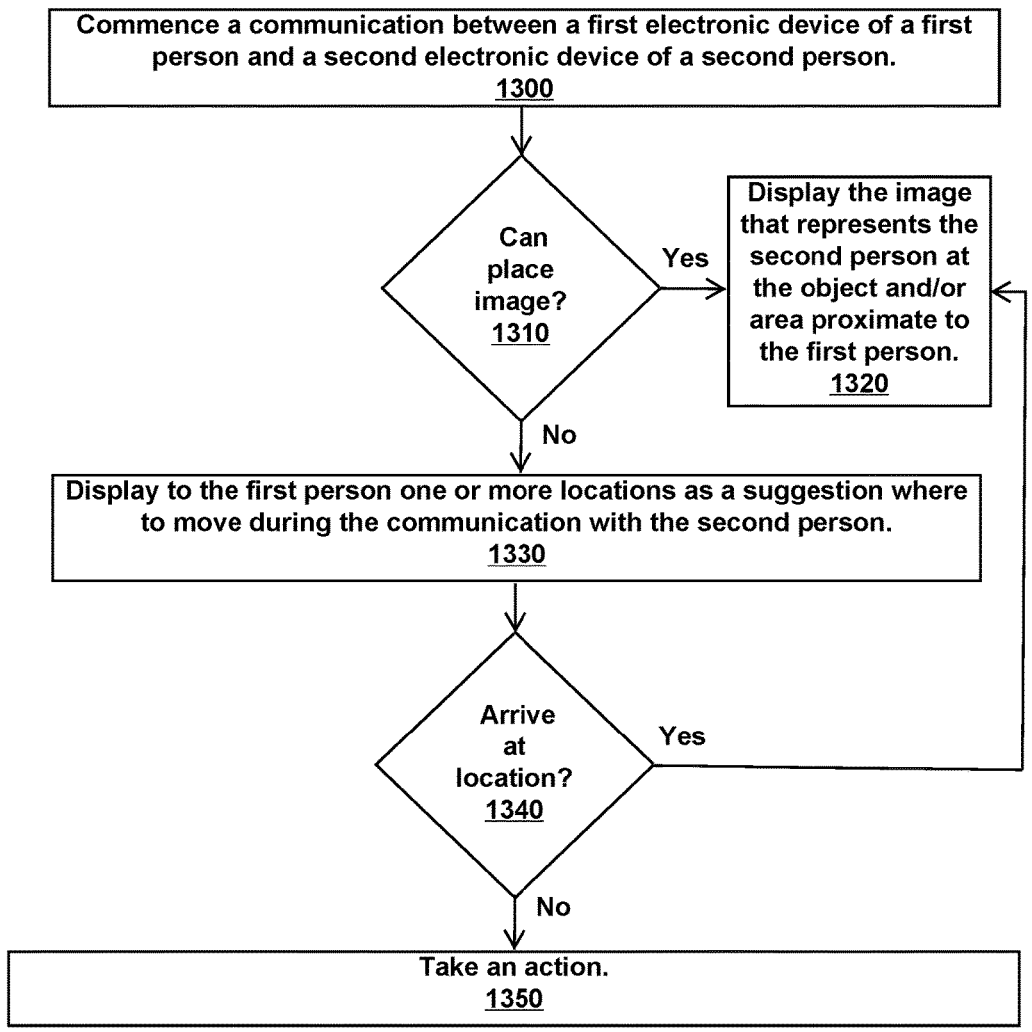
FIG. 13 is a method to display a suggestion for a location for a communication in accordance with an example embodiment.

FIG. 13 is a method to display a suggestion for a location for a communication.

Block 1300 states commence a communication between a first electronic device of a first person and a second electronic device of a second person.

The communication may have already commenced, is beginning to commence, or has not yet commenced.

Block 1310 makes a determination as to whether an object and/or area exist proximate to the first person to place an image that represents the second person. For example, the first electronic device determines whether a location near the first person is available and suitable to accommodate the image while the first and second person engage in the communication.

If the answer to the determination in block 1310 is "yes" then flow proceeds to block 1320 that states display the image that represents the second person at the object and/or area proximate to the first person. For example, the first electronic device selects an object and displays the image on or near the object.

If the answer to the determination in block 1310 is "no" then flow proceeds to block 1330 that states display to the first person one or more locations as a suggestion where to move during the communication with the second person. For example, the electronic device of the first person has an image placement determiner or module that displays suggested or alternate locations where the first person can move for the communication. These suggested locations have one or more benefits over a current location of the first person. As an example, a suggested location has an object and/or area to receive the image during the call. As another example, a suggested location has a quieter environment or noise level than the current location of the first person. As another example, a suggested location has a better or improved factor or condition for the communication than the current location of the first person (such as having improved lighting, having less people, having improved ambient conditions, having an improved level of privacy for the communication, having available and/or suitable objects and/or areas to receive the image or to receive the first person, having an improved condition or factor discussed herein).

Block 1340 makes a determination as to whether the first person arrives at one of the suggested locations. If the answer to this determination is "yes" then flow proceeds to block 1320. If the answer to this determination is "no" then flow proceeds to block 1350 that states take an action that includes one of canceling, delaying, or continuing the communication.

Before a communication commences or during a communication, the electronic device displays locations where the user can move and/or where an image representing the other party will be or can be placed. For example, the electronic device simultaneously displays multiple areas to enable the user to select one of these areas for the communication.

Consider an example in which an electronic device of a user receives an incoming call while the user is in a crowded restaurant. A location next to the user does not include an object and/or area to receive an image of the caller, but such a location does exist in another area of the restaurant. The electronic device displays this location to the user, but the user decides not to move to that location. The call proceeds without displaying an image of the caller to the user. Alternatively, the call proceeds with the image of the caller appearing on the display of the electronic device but not being displayed to appear on an object or at an area next to the user.

Consider an example in which an electronic device includes an image placement module that determines when an object and/or area are not available to place an image during a communication. The image placement module determines multiple locations proximate to the user with an available and/or suitable object and/or an area for the communication. By way of example, these locations include one or more of empty spaces that are available (such as a place to stand or sit). The electronic device displays these multiple different locations as suggestions to where the user should move for or during the communication.

Figure 14:
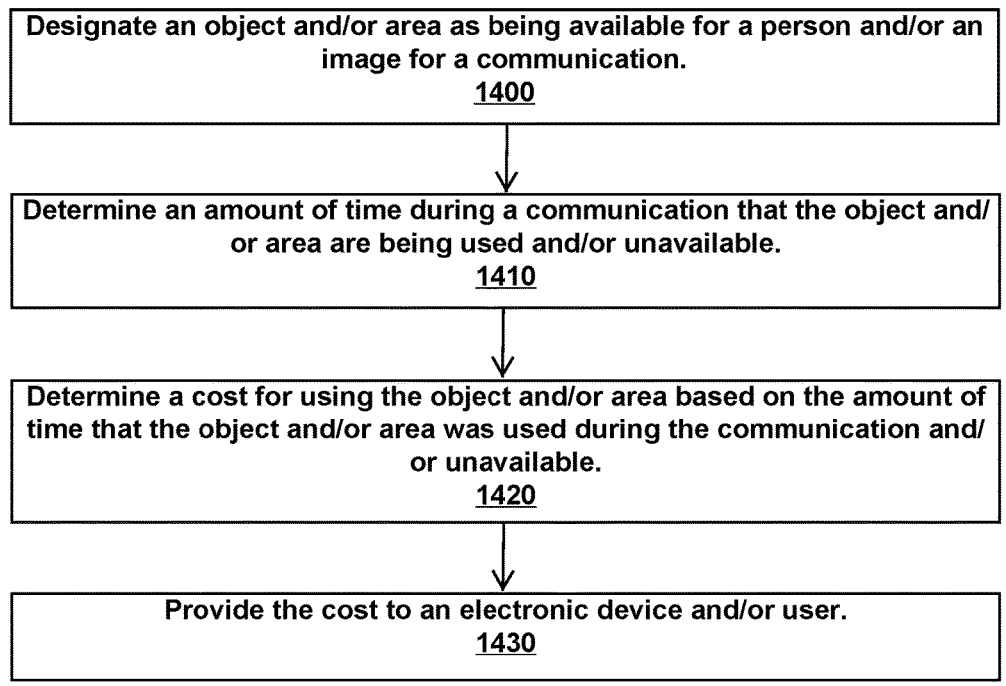
FIG. 14 is a method to determine a cost to use an object and/or area during a communication in accordance with an example embodiment.

FIG. 14 is a method to determine a cost to use an object and/or area during a communication.

Block 1400 states designate an object and/or area as being available for a person and/or an image for a communication.

By way of example, an electronic device stores, transmits, broadcasts, and/or avails this designation to other electronic devices. For instance, a store or establishment includes a wireless network that provides a map or locations in the store that are available for communications. Alternatively, the map shows locations that are not available with all other locations in the store being available.

Block 1410 states determine an amount of time during a communication that the object and/or area are being used and/or unavailable.

By way of example, an electronic device uses an object and/or area to receive an image during a communication. During this time, the object and/or area are not available to other electronic devices and/or other persons. For instance, while an electronic device of a user displays an image on an empty chair during a communication, other users cannot sit in the chair. Further, during this time, other electronic devices cannot use the chair for their communication.

Block 1420 states determine a cost for using the object and/or area based on the amount of time that the object and/or area was used during the communication and/or unavailable.

The cost can be based on the time the object and/or area was used and/or unavailable. In addition to the time or as an alternative to the time, the cost can be based on a size and/or a location of the object and/or area. For example, objects with a larger size have a larger associated cost than objects with a smaller size. As another example, objects and/or areas within a first location have a higher or lower cost than objects and/or areas within a second location.

Block 1430 states provide the cost to an electronic device and/or a user. For example, the cost is displayed, stored, transmitted, and/or processed.

Consider an example in which a coffee shop charges customers a fee when electronic devices of customers use or occupy an empty space with an image during a communication. For instance, a customer receives or initiates a communication to a friend, and an electronic device of the customer displays an image of the friend to appear on an empty chair in the coffee shop. The communication endures for thirty minutes. During this time, a wireless network in the coffee shop notifies other customers and/or electronic devices of other customers not to sit in the chair or otherwise use the empty chair since it is not available. In return for this right to utilize the empty chair for thirty minutes, the coffee shop charges the customer a fee. This fee is based on the amount of time the customer used the chair.

Consider an example in which an electronic device of a user rents space on an empty space on a chair during a phone call. A server communicates with the electronic device and calculates fees to rent the space. For example, a clock module tracks a time how long the image occupies the empty space during the phone call, and a processor calculates a cost to rent the empty space based on the time how long the image occupied the empty space and a size of the empty space.

FIGS. 15A-15J show a communication between two people.

Figure 15A:
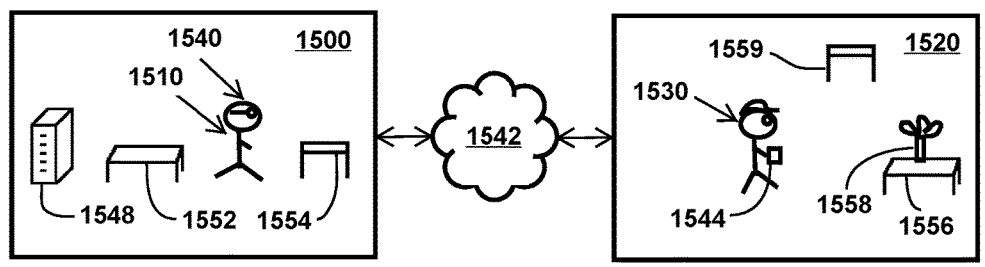
FIGS. 15A-15J show a first location with a first person having a first electronic device that communicates with a second electronic device of a second person at a second location in accordance with example embodiments.

FIG. 15A shows a first location 1500 with a first person 1510 and a second location 1520 with a second person 1530. A wearable electronic device (WED) 1540 on the first person 1510 communicates over a network 1542 with a handheld portable electronic device (HPED) 1544 with the second person 1530.

The first location 1500 shows a cabinet 1548, a table 1552, and an empty chair 1554 near the first person 1510. The second location shows a table 1556 and vase 1558 and a stool 1559 near the second person 1530. The first and second locations depict a scene before a communication commences between the WED 1540 and the HPED 1544.

Figure 15B:
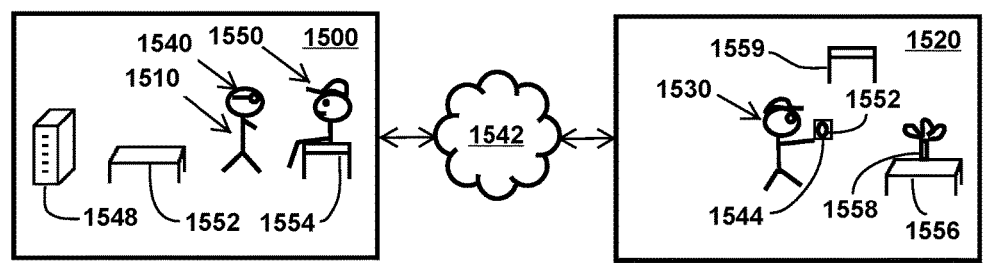

FIG. 15B shows the first and second locations after the communication commences between the WED 1540 and the HPED 1544. When the communication commences, the WED 1540 displays to the first person 1510 an image 1550 that represents the second person 1530 on the empty chair 1554. At the same time, the HPED 1544 displays to the second person 1530 an image 1552 that represents the first person 1510 standing next to the table 1556.

The images 1550 and 1552 are sized, shaped, colored, and/or configured to appear to exist at their respective locations. To the first person 1510, the image 1550 appears to exist at and interact with the real objects at the location 1500. Likewise, to the second person 1530, the image 1552 appears to exist at and interact with the real objects at the location 1520. In this manner, the first person 1510 talks to the image 1550 as if the image were actually the second person 1530 sitting on the chair 1554, and the second person 1530 talks to the image 1552 as if the image were actually the first person 1510 standing next to the table 1556.

Figure 15C:
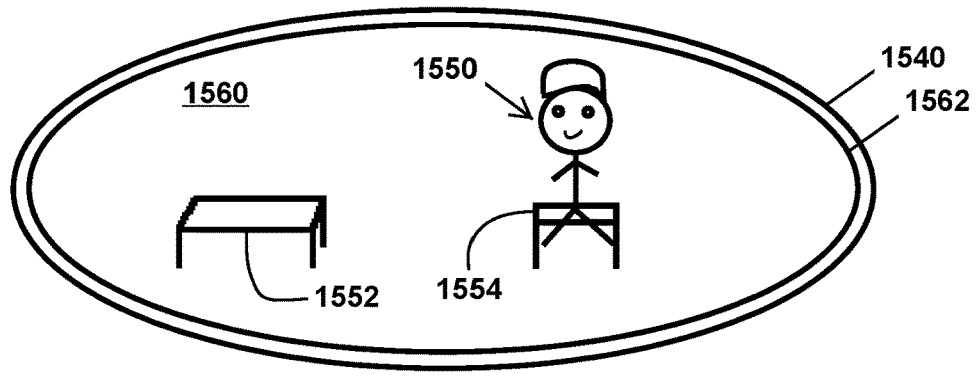

FIG. 15C shows a field of view 1560 of the first person through or on a display 1562 of the WED 1540. The field of view 1560 includes the table 1552 along with the image 1550 sitting on the chair 1554. The cabinet 1548 (shown in FIGS. 15A and 15B) is still at the location 1500 but is not currently in the field of view 1560 of the first person.

Figure 15D:
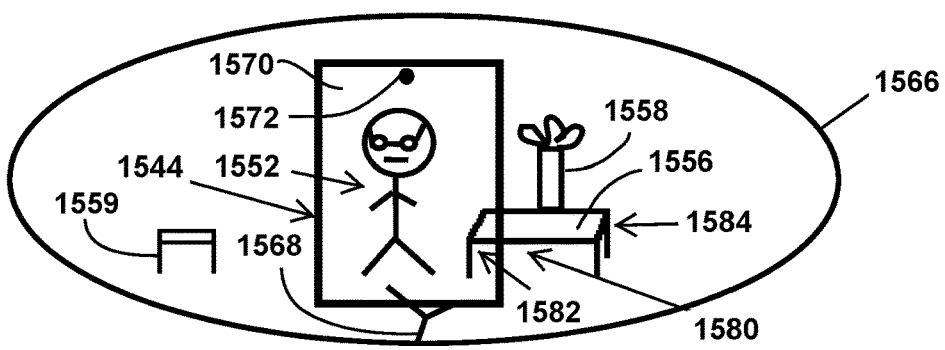

FIG. 15D shows a field of view 1566 of the second person and includes the stool 1559, the table 1556 and vase 1558, and a hand 1568 of the second person holding the HPED 1544. A display 1570 of the HPED 1544 displays the image 1552 standing next to the table 1556 and vase 1558. A camera 1572 in the HPED 1544 displays a real time view of the image 1552 superimposed in the field of view 1566 of the second person such that the image 1552 appears to be standing next to the table.

As shown in FIG. 15D, the HPED 1544 crops the image captured by the camera 1572 such that the display 1570 displays a portion of the field of view 1566 blocked by the body of the HPED 1544. Video or images displayed on the display 1570 are positioned and sized on the display to match, complete, and coincide with the real objects being captured with the camera 1572. For example, the field of view 1566 shows a blocked portion 1580 of the table being cutoff from view due to the body of the HPED 1544. In other words, the second person 1530 is unable to see the entire table 1556 because the HPED block a portion of this table. This portion being blocked 1580 (i.e., an end of table 1556) is reproduced on the display 1570 of the HPED 1544 with reproduced portion 1582.

The reproduced portion 1582 of the table 1556 matches the blocked portion 1580 and aligns with the portion of the table 1556 in the field of view 1566 such that the table 1556 appears to the second person 1530 in its entirety. The blocked portion 1582 of the table 1556 combines with an unblocked portion 1584 of the table 1556 to reproduce or show the entire table 1556 to the second person 1530.

The camera may capture a field of view that is actually larger than, different than, or unequal to the portion of the field of view of the user being blocked with the body of the HPED. An image adjustment determiner or module adjusts or changes an amount of the image being displayed so the display displays an amount of the captured image that equals the amount of the field of view being blocked with the body of the HPED. Thus, the image adjustment determiner adjusts how much of or what portion of the images of the camera appear on the display. These adjustments coincide with or are based on how much of or what portion of the body of the HPED blocks the field of view of the user. When the HPED displays an amount of image of the field of view of the camera to equal an amount of the field of view of the user being blocked, then the images on the display of the HPED coincide with and align with the real objects in the field of view of the user. As such, the user is able to see an entirety of the objects in the field of view, including the objects or portions of objects being blocked since these objects or portions of objects are being displayed on the display.

The HPED 1544 or an image adjustment determiner or module determines a size, an amount, and a location of images to show on the display 1570 based on one or more of a location of the HPED 1544 with respect to a line of sight of the second person 1530, object recognition of objects in the field of view, a distance from the eyes of the second person 1530 to the HPED 1544, a distance from the HPED 1544 to objects in the field of view of the camera 1572, a size of the HPED 1544 that blocks the field of view 1566 of the second person 1530, an angle or tilt of the HPED 1544, and a portion of the field of view of the user being blocked with the body of the HPED.

By way of example, as an electronic device moves closer to the face of a person, the electronic device blocks a larger portion of the field of view of the person. As the electronic device, moves farther from the face of the person, the electronic device blocks a smaller portion of the field of view of the person. The image adjustment determiner crops, adjusts, or sizes images or video captured with the camera based on this distance.

As another example, a size of the object being blocked and a distance of this object from the electronic device and/or person also effects how much of the object is blocked with the physical body of the electronic device. Consider an example in which the person holds a tablet computer two feet from his face. A body of the tablet computer blocks a portion of a chair that is in front of the person. A line of sight of the person includes the chair, but the person is unable to see an entirety of the chair because a portion of the chair is blocked with the body of the electronic device. As the chairs moves closer along the line of sight of the person, the electronic device blocks a larger portion of the field of view of the chair. As the chairs, moves farther along the line of sight of the person, the electronic device blocks a smaller portion of the field of view of the chair.

The image adjustment determiner or module can include or communicate with a distance determiner or module that determines distances used in making adjustments so the amount of image displayed represents, coincides with, or equals an amount of the field of view being blocked with the electronic device. For example, the distance determiner determines one or more of a distance of the electronic device to or from a face or body of the user, a distance of the electronic device and/or user to or from objects that are proximate to the user and/or electronic device.

Figure 15E:
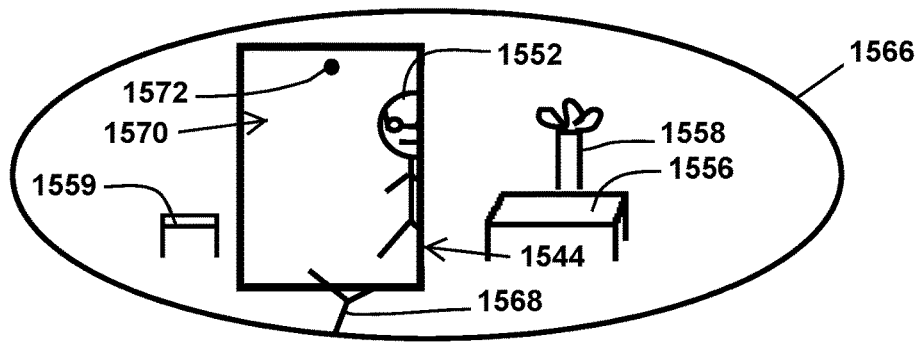

FIG. 15E shows the field of view 1566 after the hand 1568 of the second person moves the HPED 1544 toward the stool 1559. A location of the image 1552 remains stationary or fixed as being next to the table 1556 in the field of view 1566. The display 1570 of the HPED 1544 cuts off or removes a portion of the image 1552 since the camera 1572 is not directed to the location where the image 1552 is located (i.e., the location next to the table 1556). In other words, the HPED 1544 is no longer pointed at or directed toward the location of where the image 1552 exists next to the table 1556 and vase 1558.

Figure 15F:
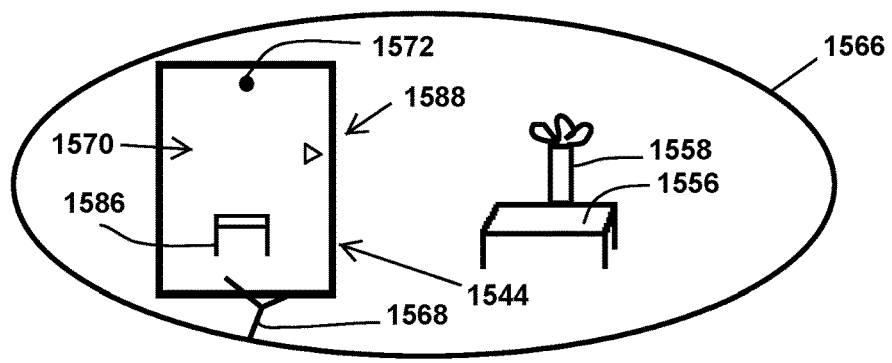

FIG. 15F shows the field of view 1566 after the hand 1568 of the second person moves the HPED 1544 such that the camera 1572 no longer captures images of the location of the table 1556 and vase 1558 and the location of the image next to the table 1556. Instead, the camera 1572 is directed at the empty stool, and the display 1570 displays an image or video 1586 of the stool. A body of the HPED 1544 blocks the second person from seeing the stool, so a real time image or video 1586 of the stool appears on the display 1570.

A location of the image 1586 of the stool on the display 1570 coincides with an actual location of the real, physical stool at the second location. Thus, the image 1586 of the stool appears on the display 1570 with a size and a location that matches a size and a location of real stool that the second person would see if the HPED were not blocking the second person from seeing the real stool.

A visual indication 1588 appears on the display 1570. This visual indication notifies the second person that the display no longer includes the image of the first person during the communication. By way of example, the visual indication 1570 includes an arrow that points to the location where the image exists (i.e., points to the location next to the table 1556 where the image representing the first person was placed). If the second person moved his hand to adjust a view of the camera 1572 to include this location next to the table 1556, then the image of the first person would reappear on the display.

Figure 15G:
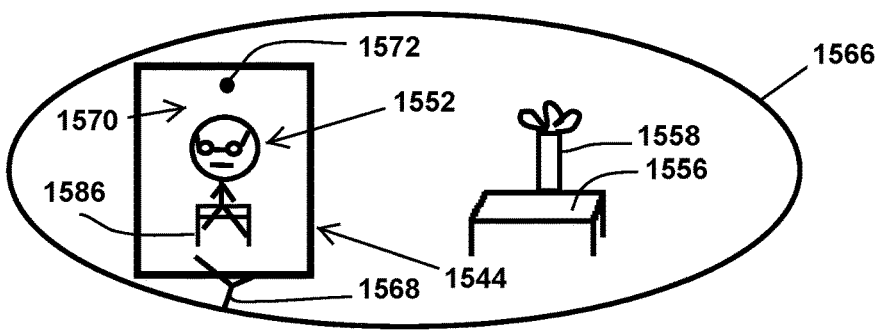

FIG. 15G shows the field of view 1566 in which the image 1552 reappears on the display 1570 of the HPED 1544. The image 1552 is repositioned or re-oriented to appear to be sitting on the image 1586 of the stool. Here, a location of the image 1552 moved from being initially located next to the table 1556 (see FIG. 15D) to being located on the stool 1559 (see FIGS. 15D and 15E). Since a body of the HPED 1544 blocks the second person from seeing the stool 1559, the image 1586 of the stool appears on the display 1570 at the location where the stool 1559 exists.

Figure 15H:
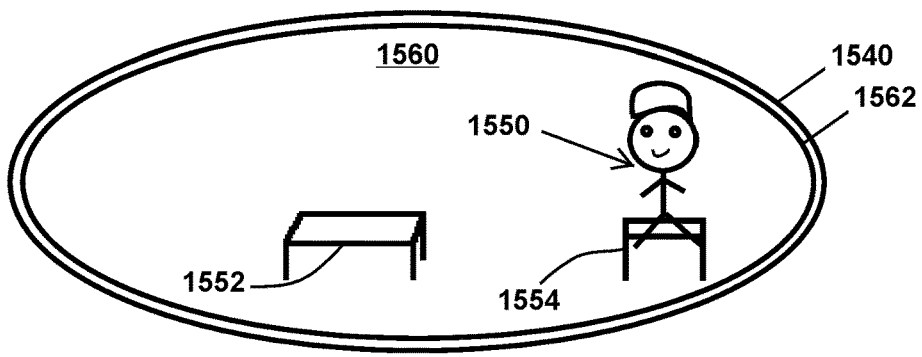

A comparison of FIG. 15C and FIG. 15H shows that the WED 1540 moved such that a location of the image 1550 is at an end of the field of view 1560 in FIG. 15H. The location of the image 1550 remains fixed or stationary at its location while the WED moves. When the field of view of the WED 1540 and/or first person 1510 changes, the image 1550 remains at its location in the field of view.

Figure 15I:
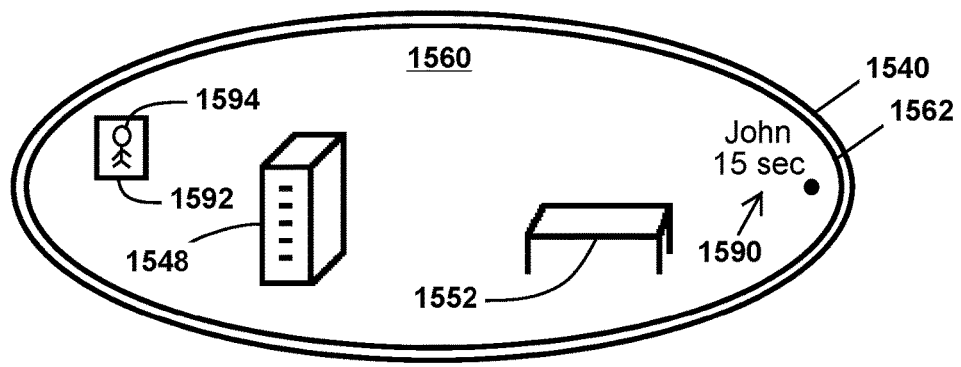

FIG. 15I shows that the field of view 1560 no longer includes the location of the image 1550 (see FIG. 15H) but includes the table 1552 and the cabinet 1548. A visual indication 1590 indicates that the image representing the second person is no longer in the field of view. For example, this visual indication includes a blinking or colored indication (such as a circle or dot) that provides a location and direction of where image is located. Here, the visual indication 1590 is located on a right side of the display 1562 of the WED 1540. If the first person moved his head toward the visual indication, then his field of view would simultaneously move toward or in the direction of the location of the image. Text of "John" appears on the display 1562 to notify the first person that the communication is with John, and John's image is located to a right side of a current field of view or line of sight of the first person. The display 1562 also shows "5 sec" to indicate a time that the field of view has not included the image, a time when a location of the image will change to a place within the current field of view, or another time discussed herein.

FIG. 15I includes a preview box or window 1592 that includes a small image 1594 that represents or emulates the image 1550. This preview box or window appears when the field of view no longer includes the location of the image. For example, the preview box shows an image of John (i.e., the person with whom the user is communicating).

Figure 15J:
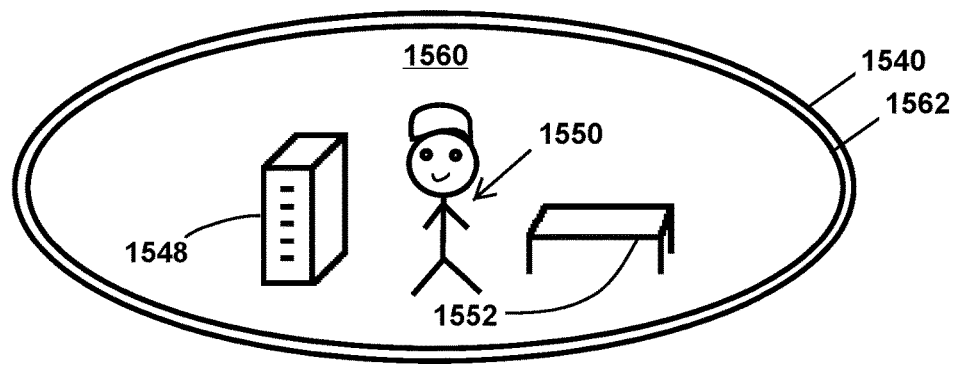

FIG. 15J shows the field of view 1560 in which the image 1550 reappears on the display 1562 of the WED 1540. The image 1550 is repositioned or re-oriented to appear to be standing between the cabinet 1548 and the table 1552. Here, a location of the image 1550 moved from being initially located on the chair 1554 (see FIG. 15C) to being located between the cabinet 1548 and the table 1552.

Figure 16A:
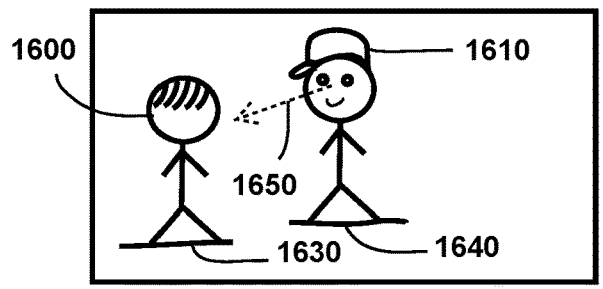
FIGS. 16A-16C show a person communicating with an image that moves from one location to another location in accordance with example embodiments.

FIG. 16A shows a person 1600 communicating with an image 1610 while the person stands at a first location 1630 and the image appears at another location 1640 that is proximate to the first location. The image 1610 faces or looks toward the person 1600 at the first location 1630. A gaze or line of sight 1650 of the image 1610 is directed at the person 1600.

Figure 16B:
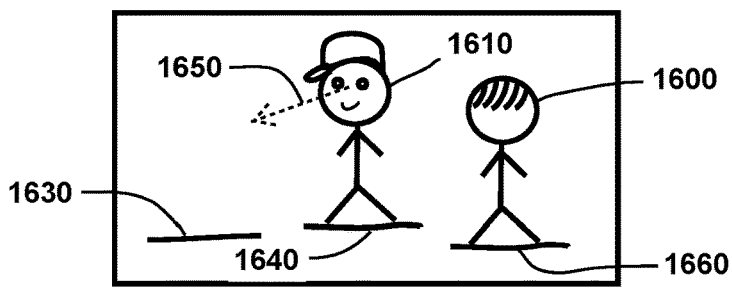

FIG. 16B shows the person 1600 communicating with the image 1610 after the person 1600 moves from the first location 1630 to a second location 1660 that is proximate to the location 1640 where the image 1610 appears. The gaze or line of sight 1650 of the image 1650 continues to be directed to the first location 1630 where the person 1600 was standing. Even though the person 1600 moved from the first location 1630 to the second location 1660, the image 1610 continues to appear to look at the first location 1630 where the person 1600 was previously standing.

Figure 16C:
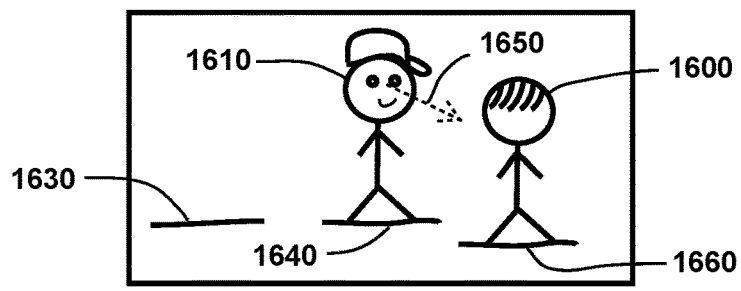

FIG. 16C shows the person 1600 communicating with the image 1610 after the person 1600 moves from the first location 1630 to the second location 1660 that is proximate to the location 1640 where the image 1610 appears. The gaze or line of sight 1650 is directed to the person 1600 standing at the second location 1660. The image thus moved or changed the gaze or line of sight 1650 from being directed at the first location 1630 to being directed at the second location 1660.

The gaze or line of sight 1650 of the image 1610 can be tied to or based on a location of the person 1600 or another object or event. FIGS. 16A-16C show a time delay occurs for when the image 1610 changes its view while talking to the moving person 1600. Alternatively, the image 1610 changes its view simultaneously with movements of the person 1600 such that the gaze or line of sight 1650 tracks and follows real time movements of the person 1600.

Consider an example in which a location tracker or determiner tracks a location of the image and/or a location of the user. The location tracker communicates with an image orientation module such that a gaze of the image follows or tracks a location of the person with whom the image communicates. As the person moves to different locations, the gaze of the image moves to follow the person. For instance, a body and/or head of the image move or rotate. Eyes of the image can also move to track and follow the person.

Consider another example with a tracking mode of operation in which a gaze of the image follows or tracks a gaze of the other person with whom the person communicates. For example, a first person communicates with a second person while an image of the second person appears to the first person. The image follows and tracks movements and orientations of the second person. When the second person moves his head to his left, then the image in turn moves its head to its left. In this manner, the second person controls movements, orientations, and gaze of the image.

Figure 17:
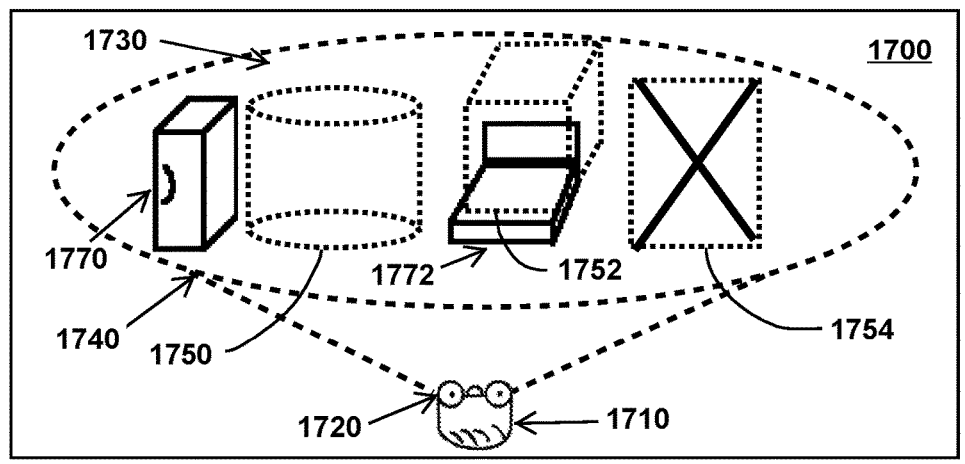
FIG. 17 shows a location at which a person wears a wearable electronic device that displays areas to receive an image or a person for a communication in accordance with an example embodiment.

FIG. 17 shows a location 1700 at which a person 1710 wears a wearable electronic device 1720 that displays areas 1730 to receive an image or a person for a communication. A field of view 1740 of the person 1710 and/or wearable electronic device 1720 includes two suggested areas or locations 1750 and 1752 that are suitable and/or available to include an image or a person during a communication. Location or area 1750 is next to a refrigerator 1770, and location or area 1752 is on or above a bed 1772. The field of view 1740 also includes a suggested area or location 1754 next to the bed 1772 that is not suitable and/or available to include an image or a person during a communication. By way of example, the area or location 1754 includes an indication (shown as a large "X") to indicate to the person 1710 that this area is not available and/or suitable for receiving an image during a communication or for receiving the person during a communication.

Consider an example in which the person 1710 desires to commence a call to a friend with the wearable electronic device 1720. During the call, the wearable electronic device 1720 will display an image that represents the friend. Before the call commences or while the call is commencing, the wearable electronic device 1720 displays a plurality of suggested locations 1750 and 1752 where the image of the friend could or will appear and one or more locations 1754 where the image of the friend cannot or should not appear. The person 1710 interacts with the wearable electronic device 1720 and selects one of these locations (e.g., location 1750). Alternatively, the wearable electronic device selects one of these locations and displays the image to appear at the selected location.

Consider again the example in which the person 1710 desires to commence a call to the friend. The wearable electronic device 1710 displays suggested locations 1750 and 1752 to where the person 1710 should move during the call. These locations are large enough to accommodate the person and an image of the friend during the call. The wearable electronic device 1710 also displays one or more locations 1754 that are not suitable and/or available for the person and the image during the call. For instance, location 1754 is too small to accommodate the person 1710 and the image, is too noisy for the communication, has insufficient lighting for the communication, or has another factor that makes the location undesirable for the communication.

The locations 1750, 1752, and 1754 can be displayed in various ways to visually distinguish them from other areas. For example, the areas are shown as a 2D or 3D image that represents or emulates an actual size and shape of the area. By way of illustration, area 1750 has a 3D cylindrical shape, and area 1752 has a 3D rectangular shape. Area 1754 has a 2D rectangular shape with a large "X" to indicate that this area is not recommended, suitable, and/or available for an image or the person. The areas can be outlined or filled with light, color, indicia, text, or other visual indications to visually distinguish them to the person.

Figure 18A:
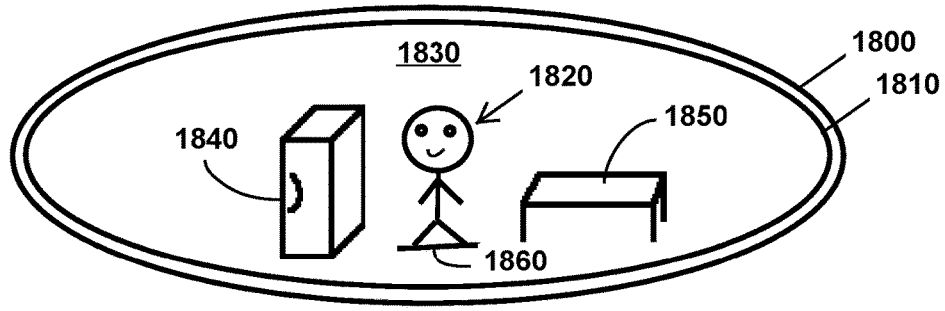
FIGS. 18A and 18B show an electronic device with a display that displays a preview of an image that represents a person to a communication before the communication with the person commences in accordance with example embodiments.
Figure 18B:
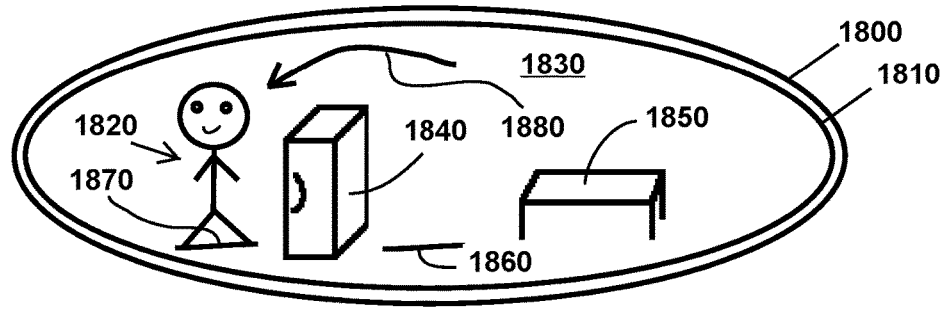

FIGS. 18A and 18B show an electronic device 1800 with a display 1810 that displays a preview of an image 1820 that represents a person to a communication before the communication with the person commences. The image 1820 appears in a room 1830 that includes real objects, shown as a refrigerator 1840 and a table 1850.

As shown in FIG. 18A, the image 1820 in the room 1830 appears at a first location 1860 before the communication commences. A user is able to see what the image will look like and where the image will appear to exist in the room 1830 before the communication. The user is thus able to see a preview of the image before the communication commences.

As shown in FIG. 18B, the image 1820 in the room 1830 moves from the first location 1860 to a second location 1870 before the communication commences. The image moves from the first location to the second location in response to a command or instruction from a user or from an electronic device. Arrow 1880 shows that the image moved from the first location 1860 to the second location 1870.

Consider an example in which a user desires to commence a telephone call to a friend with the electronic device 1800. While the call initiates or before the call commences, the electronic device 1800 displays the image 1820 at the first location 1860. The display 1810 shows a preview of the image and where the image will be located during the telephone call to the friend. The user prefers, however, to have the image appear at the second location 1870 and instructs the electronic device 1800 to move the image from the first location to the second location. When the telephone call commences between the user and the friend, the image of the friend appears at the second location.

Figure 19A:
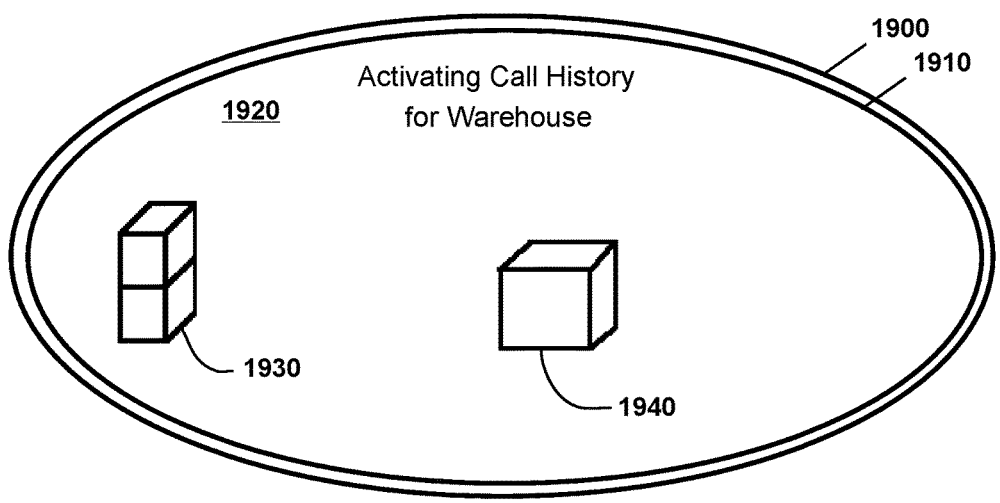
FIGS. 19A and 19B show an electronic device with a display that displays a call history for a user at a physical location in accordance with example embodiments.
Figure 19B:
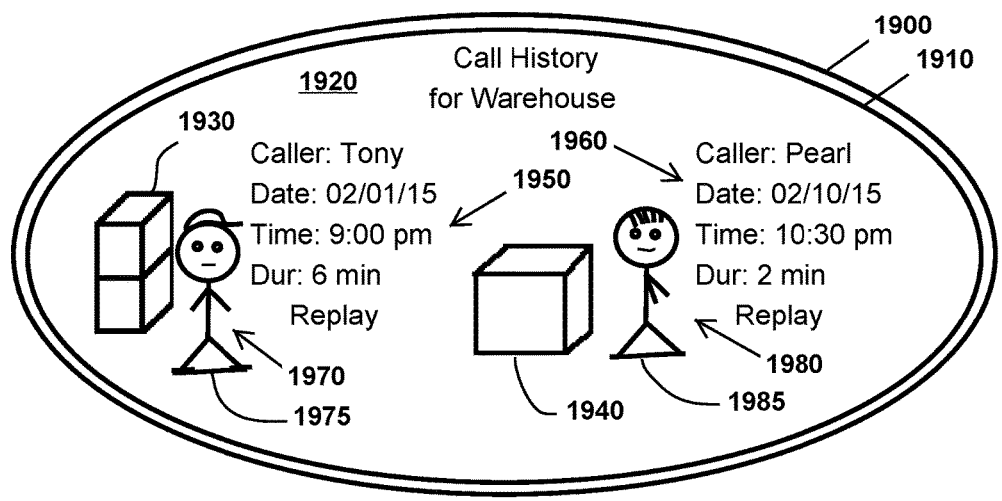

FIGS. 19A and 19B show an electronic device 1900 with a display 1910 that displays a call history for a user at a physical or actual location 1920. By way of example, the location 1920 is in a warehouse that includes real objects, shown as stacked boxes 1930 and a container 1940.

FIG. 19A shows the electronic device 1900 activating a call history for the location of the warehouse. The display 1910 displays "Activating Call History for Warehouse" in response to receiving an instruction or command to activate the call history for this location.

FIG. 19B shows the electronic device 1900 after activating the call history for the location of the warehouse. The display 1910 displays two call histories 1950 and 1960 that previously occurred at the warehouse (e.g., while the electronic device 1900 and/or user of the electronic device was physically located at the warehouse). The call histories provide information about the call including, but not limited to, one or more of an identification of the parties to the communication, a location of the parties to the communication, a duration of the communication, a time and date of the communication, a location or locations of where the image appeared during the communication, a location or locations of where a user was located during the communication, replaying of a voice and/or video of the communication, and replaying of the image at its location or locations.

By way of example, call history 1950 includes an image 1970 at a location 1975 in the warehouse where the image appeared to be located during the call. The call history 1950 also includes call history information that shows a person named Tony called on 1 Feb. 2015 at 9:00 p.m., and the call lasted for six minutes. During that call, an image of Tony appeared at location 1975 between the stacked boxes 1930 and the container 1940. The call history 1950 also includes an option to "Replay" the call. Activation of this option will replay the audio and video captured and/or presented during the call. Movement of the image 1970 will also replicate movements that the image exhibited on the call on 1 Feb. 2015.

By way of example, call history 1960 includes an image 1980 at a location 1985 in the warehouse where the image appeared to be located during the call. The call history 1960 also includes call history information that shows a person named Pearl called on 10 Feb. 2015 at 10:30 p.m., and the call lasted for two minutes. During that call, an image of Pearl appeared at location 1985 next to the container 1940. The call history 1960 also includes an option to "Replay" the call. Activation of this option will replay the audio and video captured and/or presented during the call. Movement of the image 1980 will also replicate movements that the image exhibited on the call on 10 Feb. 2015.

Consider an example in which a user enters his house and wants to see where telephone calls occurred while he was in the house during a one-week period. An electronic device of the user displays the call histories for this one-week period. As the user walks around the house, the electronic device displays the locations of the where the user was during the call, the locations of where images of the callers appeared to the user, and other call history information. The electronic device thus provides the user with a visual landscape of the previous calls during the specified time period. The user is thus able to amass a large amount of call history information in a short period of time and obtain this information visually through interaction with the electronic device. For instance, while standing in the family room, the user can see where each call occurred while he was in this room. He can also sees images of the callers and quickly identify the parties to the calls. When the user moves to other rooms in the house, the electronic device displays which calls occurred in these rooms and displays the call history information.

Figure 20A:
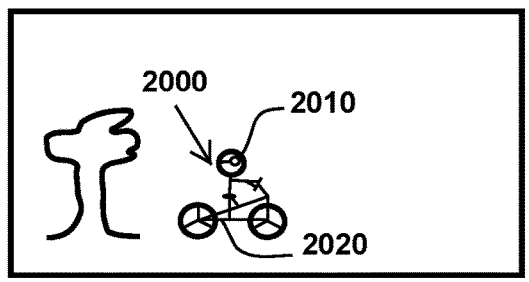
FIGS. 20A and 20B show a user wearing electronic glasses while riding a bicycle and communicating with an image of a person riding a bicycle in accordance with example embodiments.
Figure 20B:
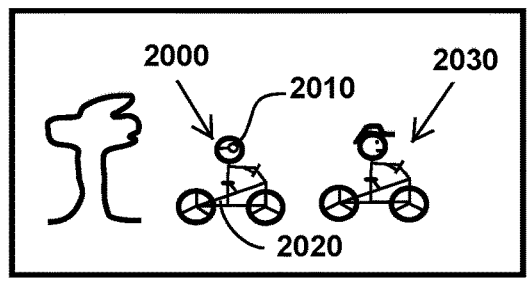

FIG. 20A shows a user 2000 wearing electronic glasses 2010 while riding a bicycle 2020 before a communication exists with another individual. FIG. 20B shows the user 2000 wearing the electronic glasses 2010 while riding the bicycle 2020 after the communication begins with the other individual.

As shown in FIG. 20B, when the user 2000 receives or commences a communication with the other individual, a display of the electronic glasses 2010 displays an image 2030 representing the other individual. This image 2030 includes an image of the other individual riding a bicycle with the user 2000.

In an example embodiment, an electronic device and/or orientation determiner or module determines an orientation and/or activity of a user to a communication and displays or provides an image of a person to this communication to have a similar or same orientation and/or activity. The image emulates or copies an orientation and/or activity of the person seeing the image.

Before or during the telephone call, an electronic device determines information about the person, such as a location of the person, movement of the person, a field of view of the person, audio of and/or around the person, a map of a location of the person, and other information discussed herein. This information enables the electronic device to determine an orientation and/or activity of the person.

Consider an example in which a person receives a telephone call on his electronic device from his mother while he sits on a chair in a coffee shop. The electronic device determines a GPS location of the person as being in the coffee shop and captures an image of the person sitting on the chair. When the telephone call commences, the electronic device displays an image of the mother sitting on a chair similar to the chair on which the person sits. The person thus sees an image of his mother sitting on chair, and she appears to be talking to him from this chair during the telephone call. An orientation of the image of the mother (i.e., a seated position) and an activity of the image of the mother (i.e., sitting on a chair) match an orientation and an activity of the person.

Thus, the electronic device can choose to present an image of a person to a communication to match an orientation and/or activity of another person to the communication. As shown in FIG. 20B, the image 2030 is oriented in a seated position with an activity of riding a bicycle. The orientation and activity of the image matches the orientation and activity of the user 2000.

An orientation and/or activity of an image can be based on other factors besides an orientation and/or activity of a person to the communication. As one example, an electronic device stores user profiles that include preferred orientations and/or activities for people. For instance, when a user receives a call from or initiates a call to his friend John, an image of John is shown standing (regardless of the orientation and/or activity of John or the user). As another example, the electronic device displays an image based on a location of the party to the communication. For instance, when the user receives a call from or initiates a call to his brother, an real-time image of the brother is shown with a background that includes a landmark or weather where the brother is located (such as showing an image of snow falling if the brother is located in snowy environment or showing an image of the Statute of Liberty if the brother is located in New York city).

Figure 21:
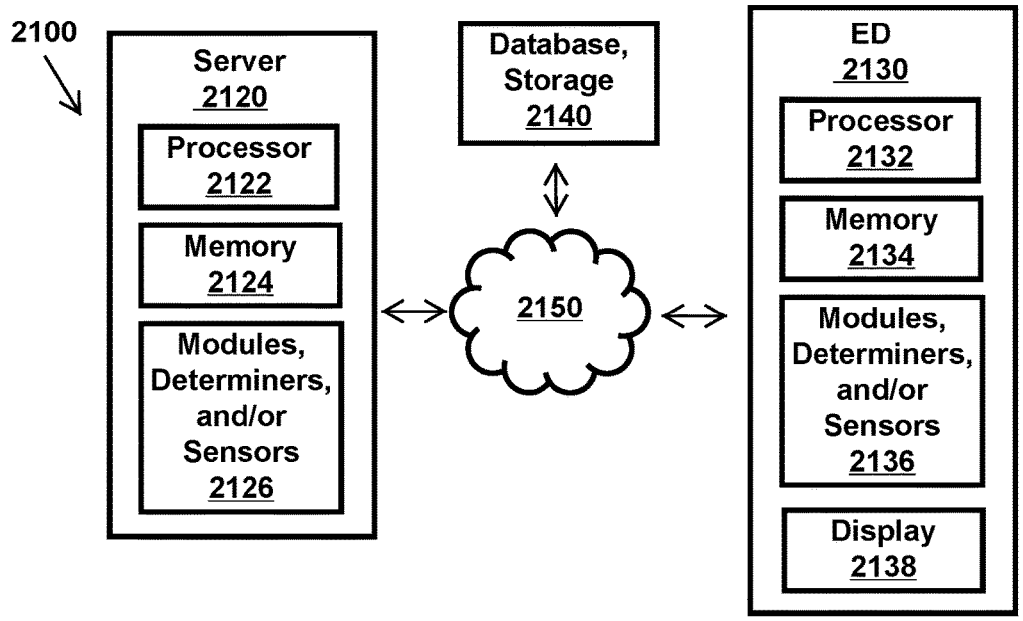
FIG. 21 is an electronic system in accordance with an example embodiment.

FIG. 21 is an electronic system or computer system 2100 that includes one or more servers 2120 in communication with one or more electronic devices 2130 and a database, storage, or memory 2140 via one or more networks 2150. The server 2120 includes a processor 2122, a memory 2124 coupled to or in communication with the processor 2122, and one or more modules, determiners and/or sensors 2126 (examples being discussed herein). The electronic device 2130 includes a processor 2132, a memory 2134 coupled to or in communication with the processor 2132, one or more modules, determiners and/or sensors 2136 (examples being discussed herein), and a display 2138.

Figure 22:
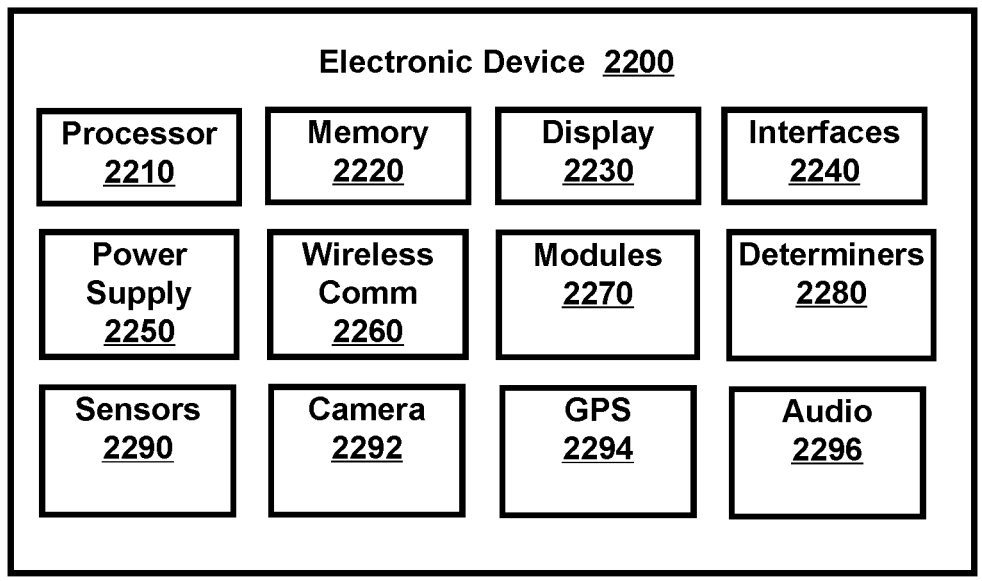
FIG. 22 is an electronic device in accordance with an example embodiment.

FIG. 22 is an electronic device 2200 that includes one or more of the following: a processing unit or processor 2210, a computer readable medium (CRM) or memory 2220, a display 2230, one or more interfaces 2240 (such as a network interface, a graphical user interface, a natural language user interface, and/or an interface that combines reality and virtuality), a battery or a power supply 2250, wireless communication 2260, one or more modules 2270 (for example to execute one or more methods blocks described herein), one or more determiners 2280 (for example to execute one or more method blocks described herein), one or more sensors 2290 (examples described herein), one or more cameras 2292, a Global Positioning System 2294, and audio 2296 (such as a speaker and/or microphone).

Figure 23:
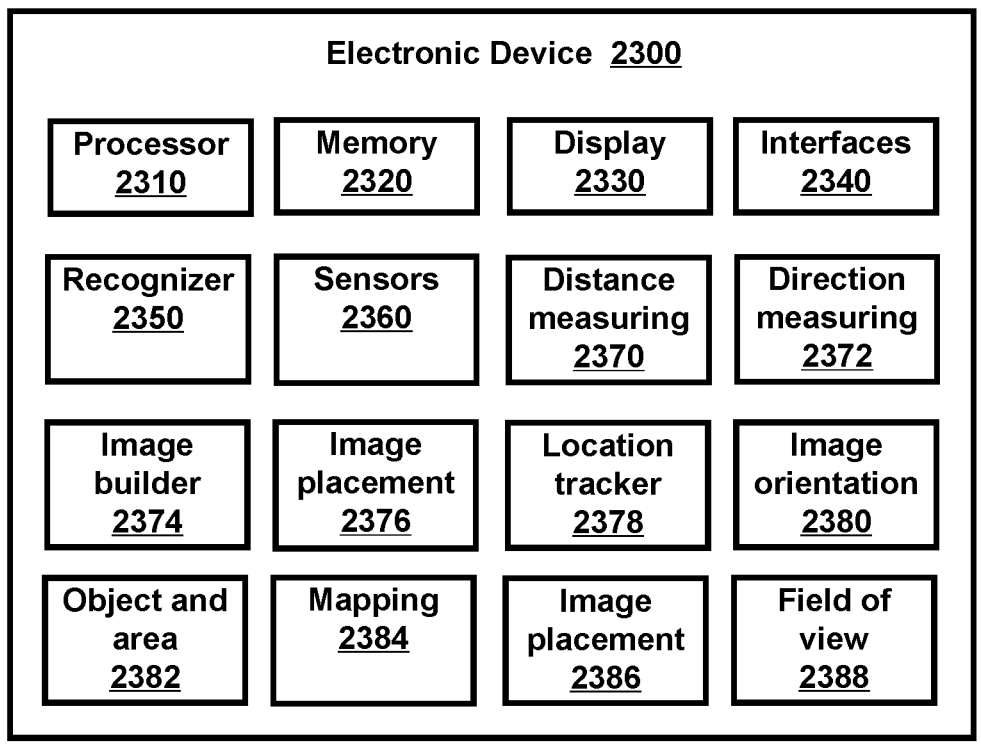
FIG. 23 is an electronic device in accordance with an example embodiment.

FIG. 23 is an electronic device 2300 that includes one or more of the following: a processing unit or processor 2310, a computer readable medium (CRM) or memory 2320, a display 2330, one or more interfaces 2340 (such as a network interface, a graphical user interface, a natural language user interface, and/or an interface that combines reality and virtuality), one or more recognizers 2350 (such as object recognition software and/or facial recognition software), and one or more sensors 2360 (such as micro-electro-mechanical systems sensor, a motion sensor, an optical sensor, radio-frequency identification sensor, a global positioning satellite or system sensor, a solid state compass, gyroscope, an accelerometer, an electronic leveler, a weather sensor, other sensors discussed herein). The electronic device 2300 further includes one or more determiners and/or modules that include but are not limited to: distance measuring 2370 (such as a laser, an electromagnetic wave transmitter/receiver, a rangefinder, and/or a camera), direction measuring 2372 (such as a compass, a magnetometer, a heading indicator, an inclinometer, a gyroscope, an accelerometer, a sensor, or other electrical device to determine direction), image builder 2374 (such as photo or image editor or generator that builds images to represent a party to a communication), image placement 2376 (such as locating empty spaces, determining size and shape of spaces and objects, and determining orientation or direction of objects), location tracker 2378 (such as tracking location of user and/or an electronic device), image orientation 2380 (such as determining orientation of an image appropriate for an orientation of a user and adjusting image orientations), object and/or area suitability and/or availability 2382 (such as determining which objects and/or areas are suitable and/or available for a communication and selecting one or more objects and/or areas, mapping 2384 (such as mapping one or more of locations of objects, areas, and people), image placement 2386 (such as determining where to place images on or thru a display to the image appears at a location, field of view 2388 (such as determining a field of view of an electronic device and/or a user).

FIGS. 22 and 23 show various components in a single electronic device. One or more of these components can be distributed or included in various electronic devices, such as some components being included in an HPED, some components being included in a server, some components being included in storage accessible over the Internet, some components being in wearable electronic devices or an electronic scope or an electronic sighting device or a weapon or a projectile, and some components being in various different electronic devices that are spread across a network, a cloud, and/or an electronic device system or a computer system.

The processing unit or processor (such as a central processing unit, CPU, microprocessor, application-specific integrated circuit (ASIC), etc.) controls the overall operation of memory (such as random access memory (RAM) for temporary data storage, read only memory (ROM) for permanent data storage, and firmware). The processing unit or processor communicates with memory and performs operations and tasks that implement one or more blocks of the flow diagrams discussed herein. The memory, for example, stores applications, data, programs, algorithms (including software to implement or assist in implementing example embodiments) and other data.

Figure 24:
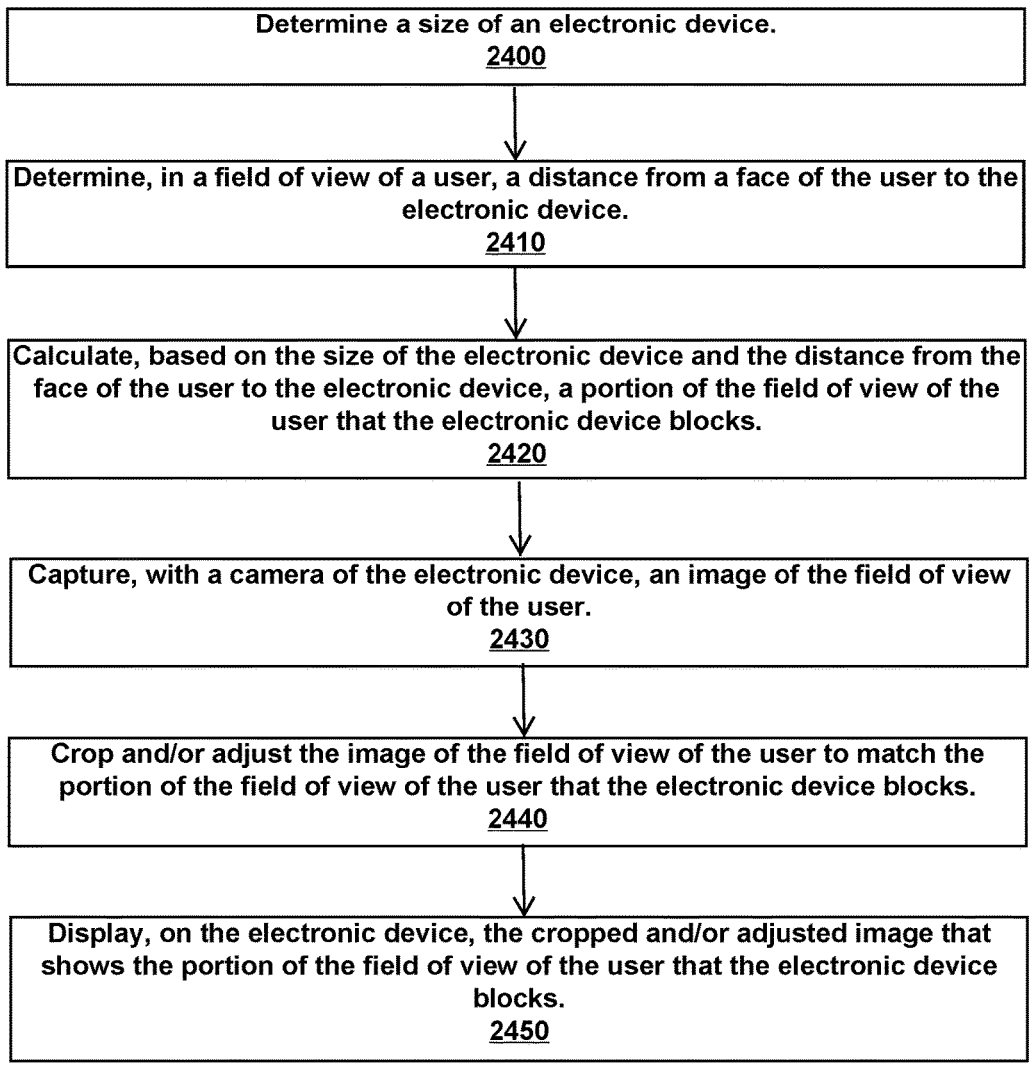
FIG. 24 is a method to display on an electronic device an image that matches a portion of a field of view that the electronic device blocks in accordance with an example embodiment.

FIG. 24 is a method to display on an electronic device an image that matches a portion of a field of view that the electronic device blocks.

Block 2400 states determine a size of an electronic device.

A size of the electronic device includes one or more of its length, height, width, surface area of one or more sides, and volume. For example, the size is a surface area (length× width or length×height) of a side of a rectangular shaped electronic device. The size can be retrieved from memory (such as being provided by a manufacturer of the electronic device).

Block 2410 states determine, in a field of view of a user, a distance from a face of the user to the electronic device.

By way of example, a distance measurer or determiner determines this distance. As another example, the distance is preset or calculated based on an arm length of a user or a natural or typical location where the user holds the electronic device.

Block 2420 states calculate, based on the size of the electronic device and the distance from the face of the user to the electronic device, a portion of the field of view of the user that the electronic device blocks.

The electronic device blocks an amount of the field of view based on its size (e.g., its surface area being shown to or visible to the user) and its distance from the face and/or eyes of the user. The amount of the field of view being blocked increases as the distance decrease, and the amount of the field of view being blocked decreases as the distance increases. These amounts will depend, in part on the shape and size of the electronic device and can be pre-calculated and stored in memory. For example, a table stores blocked amounts for given distances (e.g., store a blocked amount for each distance in increments of one centimeter or one inch from a distance of zero to three feet or the length of a user's arm).

Block 2430 states capture, with a camera of the electronic device, an image of the field of view of the user.

A camera in the electronic device captures images (such as real time video) of the field of view of the user. For example, when the user holds the camera in front of his face or body, a camera is directed toward his field of view in front of his body.

Block 2440 states crop and/or adjust the image of the field of view of the user to match the portion of the field of view of the user that the electronic device blocks.

The camera may capture a larger amount of space and/or area in the field of view of the user than the portion of the field of view that the electronic device blocks. In this instance, one or more portions of the image being captured is cropped or adjusted to match or emulate the portion of the field of view of the user that the electronic device blocks.

Block 2450 states display, on the electronic device, the cropped and/or adjusted image that shows the portion of the filed of view of the user that the electronic device blocks.

The electronic device displays an image of the field of view of the user that matches the image of the field of view being blocked. The user is thus able to see an entirety of the field of view since the display on the electronic device shows the portion of the field of view blocked by the electronic device.

Blocks and/or methods discussed herein can be executed and/or made by a user, a user agent of a user, a software application, an electronic device, a computer, and/or a computer system.

Examples of an electronic device include, but are not limited to, a server, a computer, a laptop computer, a tablet computer, a handheld portable electronic device (HPED), a portable electronic device (PED), a wearable electronic device (WED), wearable electronic glasses (WEG), a smartphone, a camera, a non-portable electronic device, a portable electronic device, and an electronic device with a processor, a memory, and a display.

Example embodiments can utilize machine learning. Furthermore, one or more modules and/or determiners can be located on an electronic device (such as an HPED) or in a server (such as a cloud server). For example, one or more modules and/or determiners are located on a server to reduce a cost, weight, and/or size of an HPED.

As used herein, "determine" includes to ascertain, to analyze, to evaluate, to process, to calculate, to decide, to obtain, to discover, to retrieve, to execute, and/or to receive.

As used herein, "empty space" is a point or a location that is not filled or occupied. For example, a location where a human would sit in an empty chair includes an empty space since this location is not filled or occupied.

As used herein, "field of view" is the extent of the observable world that is seen or captured at a given moment.

As used herein, a "module" is software (such as part of a software program) and/or hardware (such as a self-contained component, separate component, or component on a circuit board or with other components). A module can represent one or more blocks discussed herein.

As used herein, "virtual image" or "virtual object" is computer or processor generated image or object. This image or object often appears to a user in the real, physical world (such as a virtual 3D dimensional object that the user views in the real world).

As used herein, "wearable electronic device" is a portable electronic device that is worn on or attached to a person. Examples of such devices include, but are not limited to, electronic watches, electronic necklaces, electronic clothing, head-mounted displays, electronic eyeglasses or eye wear (such as glasses in which an image is projected through, shown on, or reflected off a surface), electronic contact lenses, an eyetap, handheld displays that affix to a hand or wrist or arm, and HPEDs that attach to or affix to a person.

In some example embodiments, the methods illustrated herein and data and instructions associated therewith are stored in respective storage devices, which are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to any manufactured single component or multiple components.

Method blocks discussed herein can be automated and executed by a computer, computer system, user agent, and/or electronic device. The term "automated" means controlled operation of an apparatus, system, and/or process using computers and/or mechanical/electrical devices without the necessity of human intervention, observation, effort, and/or decision.

Example embodiments include embodiments disclosed in U.S. patent application Ser. No. 14/311,532, filed 23 Jun. 2014, entitled "Sound Localization for an Electronic Call" and incorporated herein by reference.

The methods in accordance with example embodiments are provided as examples, and examples from one method should not be construed to limit examples from another method. Further, methods discussed within different figures can be added to or exchanged with methods in other figures. Further yet, specific numerical data values (such as specific quantities, numbers, categories, etc.) or other specific information should be interpreted as illustrative for discussing example embodiments. Such specific information is not provided to limit example embodiments.

What is claimed is:

1. A method that displays a suggested location where to place three dimensional (3D) images representing people to telephone calls, the method comprising:

determining, with a wearable electronic device worn by a first person and before the first person answers a telephone call from a second person, one or more suggested locations where a 3D image that represents the second person can be displayed during the telephone call to the first person with the wearable electronic device;

displaying, with the wearable electronic device worn by the first person and before the first person answers the telephone call from the second person, the one or more suggested locations where the 3D image that represents the second person can be displayed during the telephone call to the first person with the wearable electronic device;

receiving, at the wearable electronic device and from the first person, a selection of one of the one or more suggested locations; and displaying, with the wearable electronic device worn by the first person during the telephone call, the 3D image that represents the second person at the one of the one or more suggested locations selected by the first person.

2. The method of claim 1 further comprising:

displaying, with a display of the wearable electronic device before receiving the selection, the one or more suggested locations with color to visually distinguish the one or more suggested locations from other locations being displayed to the first person.

3. The method of claim 1 further comprising:

displaying, with the wearable electronic device and before receiving the selection, the one or more suggested locations as a 3D image that represents the second person so the first person has a preview of where the 3D image that represents the second person will be placed after the first person selects the one or more suggested locations.

4. The method of claim 1, wherein the wearable electronic device is one of a head mounted display and electronic glasses, and the one or more suggested locations are highlighted with color to distinguish the one or more suggested locations from other locations viewable thru a display of the wearable electronic device.

5. The method of claim 1 further comprising:

displaying, with the wearable electronic device and before receiving the selection, the one or more suggested locations with the 3D image that shows a size and a shape of the 3D image at the one or more suggested locations.

6. The method of claim 1 further comprising:

retrieving, with the wearable electronic device and before receiving the selection, different available locations where to place the 3D image that represents the second person for the telephone call between the first person and the second person, wherein the different available locations are simultaneously displayed with light.

7. The method of claim 1 further comprising:

displaying, with the wearable electronic device, a location where the 3D image that represents the second persons appeared in a previous telephone call between the first person and the second person in order to show a call history between the first person and the second person.

8. The method of claim 1 further comprising:

displaying, with the wearable electronic device before receiving the selection, a preview of the 3D image that represents the second person to show the first person what the 3D image looks like and where the 3D image that represents the second person will be placed during the telephone call.

9. A non-transitory computer readable storage media storing instructions that are executed by a one or more electronic devices in a computer system to perform a method that assists users in placing an image that represents a person during a telephone call, the method comprising:

determining, with the one or more electronic devices, locations that are suitable to include a virtual image that represents a second person in a telephone call between a first person and the second person;

displaying, with a display of a wearable electronic device being worn by the first person, one or more of the locations that are suitable to include the virtual image that represents the second person in the telephone call between the first person and the second person;

receiving, from the first person, a selection of one of the one or more locations that is suitable to include the virtual image that represents the second person in the telephone call between the first person and the second person; and displaying, with the display of the wearable electronic device and in response to receiving the selection, the virtual image that represents the second person in the telephone call at the one of the one or more locations selected by the first person.

10. The non-transitory computer readable storage media storing instructions of claim 9 in which the method further comprises:

recognizing objects proximate to the first person;

determining, based on the objects recognized proximate to the first person, an empty space that has a size large enough to include the virtual image that represents the second person; and displaying, at the empty space, a visual indication that informs the first person that the empty space is a recommended location where to locate the virtual image that represents the second person for the telephone call.

11. The non-transitory computer readable storage media storing instructions of claim 9 in which the method further comprises:

displaying, with the wearable electronic device before the telephone call commences, a preview of the virtual image that represents the second person to show the first person what the virtual image looks like and where the virtual image that represents the second person will be placed during the telephone call.

12. The non-transitory computer readable storage media storing instructions of claim 9 in which the method further comprises:

visually highlighting, on the display of the wearable electronic device, a location that is not suitable to include the virtual image that represents the second person in the telephone call between the first person and the second person.

13. The non-transitory computer readable storage media storing instructions of claim 9 in which the method further comprises:

simultaneously displaying, with the display of the wearable electronic device, the one or more locations so the first person can preview at least one different place where the virtual image will be placed during the telephone call.

14. The non-transitory computer readable storage media storing instructions of claim 9 in which the method further comprises:

displaying, with the display of the wearable electronic device, suggested locations in a field of view in a virtual environment provided by the display where the first person can move to have the telephone call with the second person.

15. The non-transitory computer readable storage media storing instructions of claim 9, wherein the wearable electronic device being worn by the first person is one of a head mounted display and electronic glasses.

16. A method executed by a one or more electronic devices in a computer system to display with a wearable electronic device that shows locations where to place virtual images that represent people during telephone calls, the method comprising:
- displaying, with a display of a wearable electronic device worn by a first person, a virtual location that includes the first person;
- determining, with the one or more electronic devices, at least one location at the virtual location to display a virtual image that represents a second person in a telephone call between the first person and the second person;
- displaying, with the display of the wearable electronic device being worn by the first person, the at least one location to display the virtual image that represents the second person in the telephone call between the first person and the second person;
- receiving, from the first person, a selection of the at least one location to display the virtual image that represents the second person in the telephone call between the first person and the second person; and
- displaying, with the display of the wearable electronic device being worn by the first person and in response to receiving the selection, the virtual image at the at least one location selected by the first person during the telephone call.

17. The method of claim 16 further comprising:
displaying, with the wearable electronic device, the at least one location with a three dimensional (3D) outline that shows a size and a shape of the at least one location.

18. The method of claim 16 further comprising:
displaying, before the telephone call commences with the wearable electronic device and at the at least one location, a preview of the virtual image that represents the second person to show the first person what the virtual image looks like and where the virtual image will be placed during the telephone call.

19. The method of claim 16 further comprising:
wherein the at least one location is displayed by highlighting the at least one location with color to enable the first person to visually distinguish the at least one location from other locations at the virtual location.

20. The method of claim 16 further comprising:
displaying, with the wearable electronic device and during the telephone call, a location highlighted with color to show where the first person can move the virtual image during the telephone call.

* * * * *